(12) United States Patent
McCarty et al.

(10) Patent No.: US 7,853,341 B2
(45) Date of Patent: Dec. 14, 2010

(54) WIRED, WIRELESS, INFRARED, AND POWERLINE AUDIO ENTERTAINMENT SYSTEMS

(75) Inventors: William A. McCarty, San Diego, CA (US); Yadir Rodriguez, San Ysidro, CA (US)

(73) Assignee: KSC Industries, Inc., San Diego, CA (US)

( * ) Notice: Subject to any disclaimer, the term of this patent is extended or adjusted under 35 U.S.C. 154(b) by 1342 days.

(21) Appl. No.: 10/783,718

(22) Filed: Feb. 20, 2004

(65) Prior Publication Data

US 2004/0234088 A1 Nov. 25, 2004

Related U.S. Application Data

(63) Continuation-in-part of application No. 10/353,805, filed on Jan. 27, 2003.

(60) Provisional application No. 60/351,843, filed on Jan. 25, 2002, provisional application No. 60/353,806, filed on Feb. 1, 2002, provisional application No. 60/371,268, filed on Apr. 8, 2002, provisional application No. 60/407,432, filed on Aug. 28, 2002.

(51) Int. Cl.
*G06F 17/00* (2006.01)

(52) U.S. Cl. .............................. 700/94; 381/77; 381/311

(58) Field of Classification Search ................. 381/300, 381/306, 77, 27, 2, 1, 79, 105, 104, 107, 381/311, 17, 18; 455/352; 700/94; 340/988, 340/990, 825, 3.54, 7.45; 379/388.01–390.04
See application file for complete search history.

(56) References Cited

U.S. PATENT DOCUMENTS

| 3,942,170 | A | 3/1976 | Whyte |
| 4,319,224 | A | 3/1982 | Tappeiner et al. |
| 4,523,128 | A | 6/1985 | Stamm et al. |
| 4,845,751 | A | 7/1989 | Schwab |

(Continued)

FOREIGN PATENT DOCUMENTS

EP 0 389 174 9/1990

(Continued)

OTHER PUBLICATIONS

A Office Action issued in a potentially related application, U.S. Appl. No. 10/353,805 dated Oct. 2, 2006.

(Continued)

*Primary Examiner*—Vivian Chin
*Assistant Examiner*—Lun-See Lao
(74) *Attorney, Agent, or Firm*—Knobbe Martens Olson & Bear LLP

(57) ABSTRACT

A method and system for communicating audio, video, and/or control signals within a home entertainment system. One or more signals are communicated between an input device and one or more output devices via one or more networks. The output device can include loudspeakers, display devices, and headphones. In some embodiments an output device, for example a center channel loudspeaker, transmits signals to other output devices. For example, the center channel loudspeaker can transmit a combined audio signal and control signal to a remote loudspeaker over a first network and transmit a video signal to a display device over a second network. The display device displays the video signal. The networks can be wireless, wired, infrared, RF, and powerline.

36 Claims, 20 Drawing Sheets

U.S. PATENT DOCUMENTS

| | | | |
|---|---|---|---|
| 5,095,382 A | 3/1992 | Abe | |
| 5,218,641 A | 6/1993 | Abe et al. | |
| 5,233,663 A * | 8/1993 | Wood | 381/80 |
| 5,406,634 A | 4/1995 | Anderson et al. | |
| 5,410,735 A | 4/1995 | Borchardt et al. | |
| 5,428,341 A | 6/1995 | Takahashi | |
| 5,471,190 A | 11/1995 | Zimmermann | |
| 5,491,755 A | 2/1996 | Vogt et al. | |
| 5,524,060 A | 6/1996 | Silfvast et al. | |
| 5,579,304 A | 11/1996 | Sugimoto et al. | |
| 5,596,603 A | 1/1997 | Haupt et al. | |
| 5,646,602 A | 7/1997 | Gertz et al. | |
| 5,652,766 A | 7/1997 | Matsumura et al. | |
| 5,661,848 A | 8/1997 | Bonke et al. | |
| 5,666,422 A * | 9/1997 | Harrison et al. | 381/18 |
| 5,666,658 A | 9/1997 | Borchardt et al. | |
| 5,668,884 A * | 9/1997 | Clair et al. | 381/82 |
| 5,694,436 A | 12/1997 | Huang et al. | |
| 5,778,077 A | 7/1998 | Davidson | |
| 5,784,468 A | 7/1998 | Klayman | |
| 5,818,247 A * | 10/1998 | Pyun | 324/756 |
| 5,946,343 A | 8/1999 | Schotz et al. | |
| 6,006,115 A | 12/1999 | Wingate | |
| 6,041,225 A * | 3/2000 | Jung | 455/352 |
| 6,061,455 A * | 5/2000 | Hadley et al. | 381/57 |
| 6,157,292 A | 12/2000 | Piercy et al. | |
| 6,215,981 B1 | 4/2001 | Borchardt et al. | |
| 6,243,413 B1 | 6/2001 | Beukema | |
| 6,337,913 B1 | 1/2002 | Chang | |
| 6,445,369 B1 | 9/2002 | Yang et al. | |
| 6,487,296 B1 | 11/2002 | Allen et al. | |
| 6,493,244 B1 | 12/2002 | Gray | |
| 6,507,273 B1 | 1/2003 | Chang et al. | |
| 6,608,907 B1 * | 8/2003 | Lee | 381/311 |
| 6,754,354 B1 | 6/2004 | Lokhoff | |
| 7,043,671 B2 | 5/2006 | Bader et al. | |
| 7,190,798 B2 * | 3/2007 | Yasuhara | 381/86 |
| 2002/0048381 A1 * | 4/2002 | Tamayama | 381/307 |
| 2002/0072816 A1 * | 6/2002 | Shdema et al. | 700/94 |
| 2002/0101357 A1 | 8/2002 | Gharapetian | |
| 2002/0135513 A1 | 9/2002 | Paschen et al. | |
| 2002/0145509 A1 | 10/2002 | Karny et al. | |
| 2003/0062990 A1 * | 4/2003 | Schaeffer et al. | 340/310.01 |
| 2003/0095096 A1 | 5/2003 | Robbin et al. | |
| 2004/0062270 A1 | 4/2004 | Son et al. | |
| 2004/0097851 A1 | 5/2004 | Inada et al. | |
| 2004/0131193 A1 | 7/2004 | Kitamura | |
| 2004/0223622 A1 * | 11/2004 | Lindemann et al. | 381/79 |
| 2004/0250273 A1 * | 12/2004 | Swix et al. | 725/25 |
| 2009/0102626 A1 | 4/2009 | Lesesky | |

FOREIGN PATENT DOCUMENTS

| | | |
|---|---|---|
| EP | 0 389 174 B1 | 9/1990 |
| EP | 0 471 477 A1 | 2/1992 |
| EP | 0 471 477 B1 | 2/1992 |
| EP | 0 613 320 A2 | 8/1994 |
| EP | 0 613 320 B1 | 8/1994 |
| EP | 0 637 796 B1 | 8/1994 |
| EP | 0 637 796 A3 | 3/1995 |
| EP | 0 493 986 B1 | 12/1995 |
| EP | 1 096 715 A2 | 5/2001 |
| EP | 1 096 716 A2 | 5/2001 |
| EP | 1 096 717 A2 | 5/2001 |
| JP | 200116879 | 6/2001 |
| JP | 200116880 | 6/2001 |
| JP | 200117750 | 6/2001 |
| WO | WO 99/39546 | 8/1999 |

OTHER PUBLICATIONS

A Office Action issued in a potentially related application, U.S. Appl. No. 10/353,805 dated Apr. 9, 2007.
A Office Action issued in a potentially related application, U.S. Appl. No. 10/613,596 dated Sep. 25, 2006.
A Office Action issued in a potentially related application, U.S. Appl. No. 10/613,596 dated Apr. 11, 2007.
A Office Action issued in a potentially related application, U.S. Appl. No. 10/353,805 dated Sep. 18, 2008.
A Office Action issued in a potentially related application, U.S. Appl. No. 10/353,805 dated Apr. 16, 2008.
A Office Action issue in a potentially related application, U.S. Appl. No. 10/353,805 dated Feb. 20, 2009.
A Office Action issue in a potentially related application, U.S. Appl. No. 12/050,786 dated Jul. 23, 2009.
A Office Action issue in a potentially related application, U.S. Appl. No. 10/353,805 dated Sep. 29, 2009.
Communication Systems Design ; "HomePlug Standard Brings Networking to the Home;" Dec. 2000; http://www.csdmag.com/main/2000/12/0012feat5.htm, 9 pages, printed Jan. 10, 2003.
Intellon Corporation, "PowerPacket™ Primer;" ; www.intellon.com, 5 pages, undated, Jan. 2001.
Texas Instruments, True Digital Audio Amplifier TAS5100 PWM Power Output Stage; www.ti.com, 15 pages, Revised May 2001.
PhonexBroadband, QX-201 NeverWire 14; www.phonex.com, 1 page, Sep. 2002.
Digigram EtherSpeaker, Networked Speaker Development Module; www.digigram.com, 4 pages, undated, Dec. 2000.
Meridian's Brochure, "Speakers;" http://meridian-audio.com/m_bro_spk.htm, 6 pages, printed Dec. 21, 2001.
Sony Consumer Electronics Guide: MDR-DS5100; http://www.sel.sony.com/SEL/consumer/ss5/home/accessories/virtualdolbyrtmdigit; 7 pages, undated, Mar. 2000.
FREESPAN™ Pure Digital Transmission, 4 pages, promotional brochure, Feb. 2000.
A Office Action issued in a potentially related application, U.S. Appl. No. 10/353,805 dated Mar. 31, 2010.
Office Action issued in a related application, U.S. Appl. No. 10/353,805 dated Sep. 30, 2010.

* cited by examiner

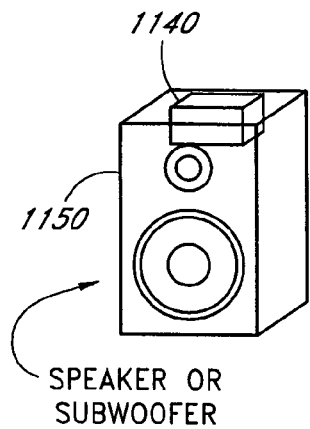
SPEAKER OR SUBWOOFER
FIG. 11B(1)
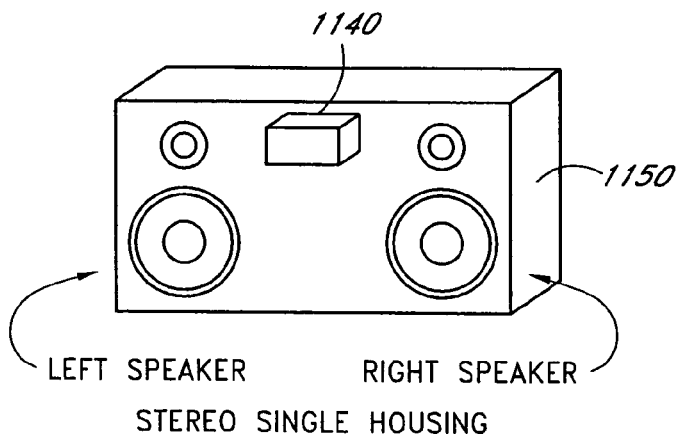
LEFT SPEAKER    RIGHT SPEAKER
STEREO SINGLE HOUSING
FIG. 11B(2)
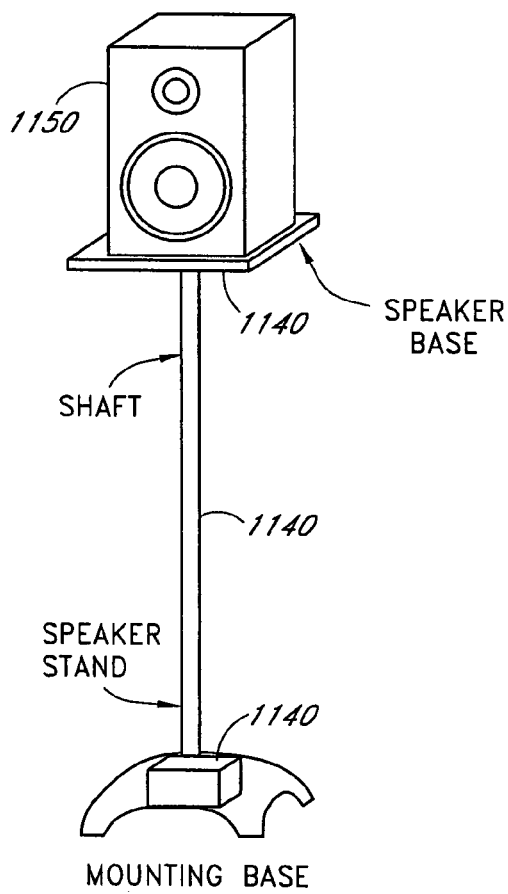
SPEAKER BASE
SHAFT
SPEAKER STAND
MOUNTING BASE
FIG. 11B(3)
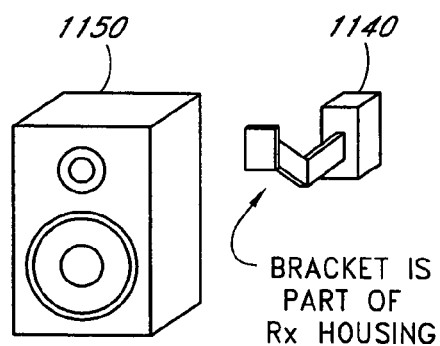
BRACKET IS PART OF Rx HOUSING
FIG. 11B(4)
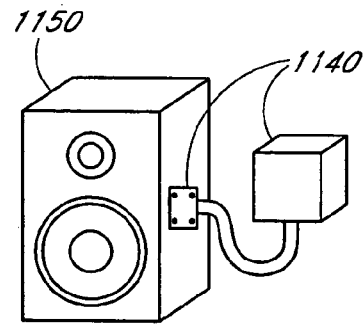
FIG. 11B(5)

WIRED, WIRELESS, INFRARED, AND POWERLINE AUDIO ENTERTAINMENT SYSTEMS

RELATED APPLICATIONS

This application is a continuation-in-part of patent application Ser. No. 10/353,805, filed Jan. 27, 2003 and entitled Wired, Wireless, Infrared, and Powerline Audio Entertainment Systems which itself claims priority to provisional patent application Ser. Nos. 60/351,843, filed Jan. 25, 2002 and entitled Wired, Wireless, and Powerline Audio Entertainment Systems, 60/353,806, filed Feb. 1, 2002 and entitled Wired, Wireless, and Powerline Audio Entertainment Systems, 60/371,268, filed Apr. 8, 2002, and entitled Wired, Wireless, Infrared, and Powerline Audio Entertainment Systems, and 60/407,432, filed Aug. 28, 2002, and entitled Wired, Wireless, Infrared, and Powerline Audio Entertainment Systems, all of which are hereby incorporated by reference in their entireties.

BACKGROUND OF THE INVENTION

1. Field of the Invention

This invention relates to home networks. More particularly, the invention provides a method and system for communicating one or more signals, via a wired, wireless, infrared, RF, or a powerline medium, to control one or more remote entertainment systems throughout a home.

2. Description of Related Art

A communication system for a home network facilitates two-way communication between a plurality of devices within the home. These devices can be fixed or portable and can include, for example, televisions, computers, stereos, speakers, monitors, printers, and other electronic appliances. For these devices to communicate throughout a home, they interface with the home network.

SUMMARY OF THE INVENTION

The systems and methods of the present invention have several features, no single one of which is solely responsible for its desirable attributes. Without limiting the scope of this invention, its more prominent features will now be discussed briefly. After considering this discussion, and particularly after reading the section entitled "Detailed Description of the Preferred Embodiments" one will understand how the features of this invention provide several advantages over traditional audio entertainment systems.

One aspect of the invention relates to a home entertainment system configured to provide an audio signal to a remote loudspeaker. The system comprises a left front channel loudspeaker, a right front channel loudspeaker, and a housing. The housing encloses a device providing one or both an audio signal and a video signal, a center channel loudspeaker coupled to receive at least a first portion of said audio signal from the device, and a transmitter configured to receive at least a second portion of the audio signal from the device and transmit audio signals to a remote loudspeaker.

Another aspect of invention is a loudspeaker housing that comprises an input coupled to receive two or more signals from an input device, a loudspeaker configured to broadcast one of the two or more received signals to a listener, and a transmitter configured to transmit one or more signals to a remote loudspeaker.

Still another aspect of the invention relates to a home entertainment system which comprises a housing which comprising a transmitter module configured to receive an audio signal from an input device and wirelessly transmit the signal to at least one remote loudspeaker, wherein the audio signal comprises a plurality of different audio tracks, a device located within the housing and configured to provide the audio signal, and at least one loudspeaker external to said housing having a receiver configured to wirelessly receive the audio signal.

Yet another aspect of the invention relates to a home entertainment system which comprises a housing enclosing at least (1) a device providing an audio signal and a video signal, and (2) a center channel loudspeaker, a left front channel loudspeaker coupled to receive at least a portion of said audio signal, a right front channel loudspeaker coupled to receive at least a portion of said audio signal, and a display device coupled to receive the video signal.

BRIEF DESCRIPTION OF THE DRAWINGS

FIG. 11B is a diagram showing multiple embodiments of a loudspeaker and receiver components from FIG. 11A.

DETAILED DESCRIPTION OF THE PREFERRED EMBODIMENTS

Preferred embodiments of the present invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific preferred embodiments of the present invention.

In connection with the following description many of the components of the various systems and the entire systems, some of which are referred to as "module," can be implemented as software, firmware or a hardware component, such as a Field Programmable Gate Array (FPGA) or Application-Specific Integrated Circuit (ASIC), which performs certain tasks. Such components or modules may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

Figure 1:
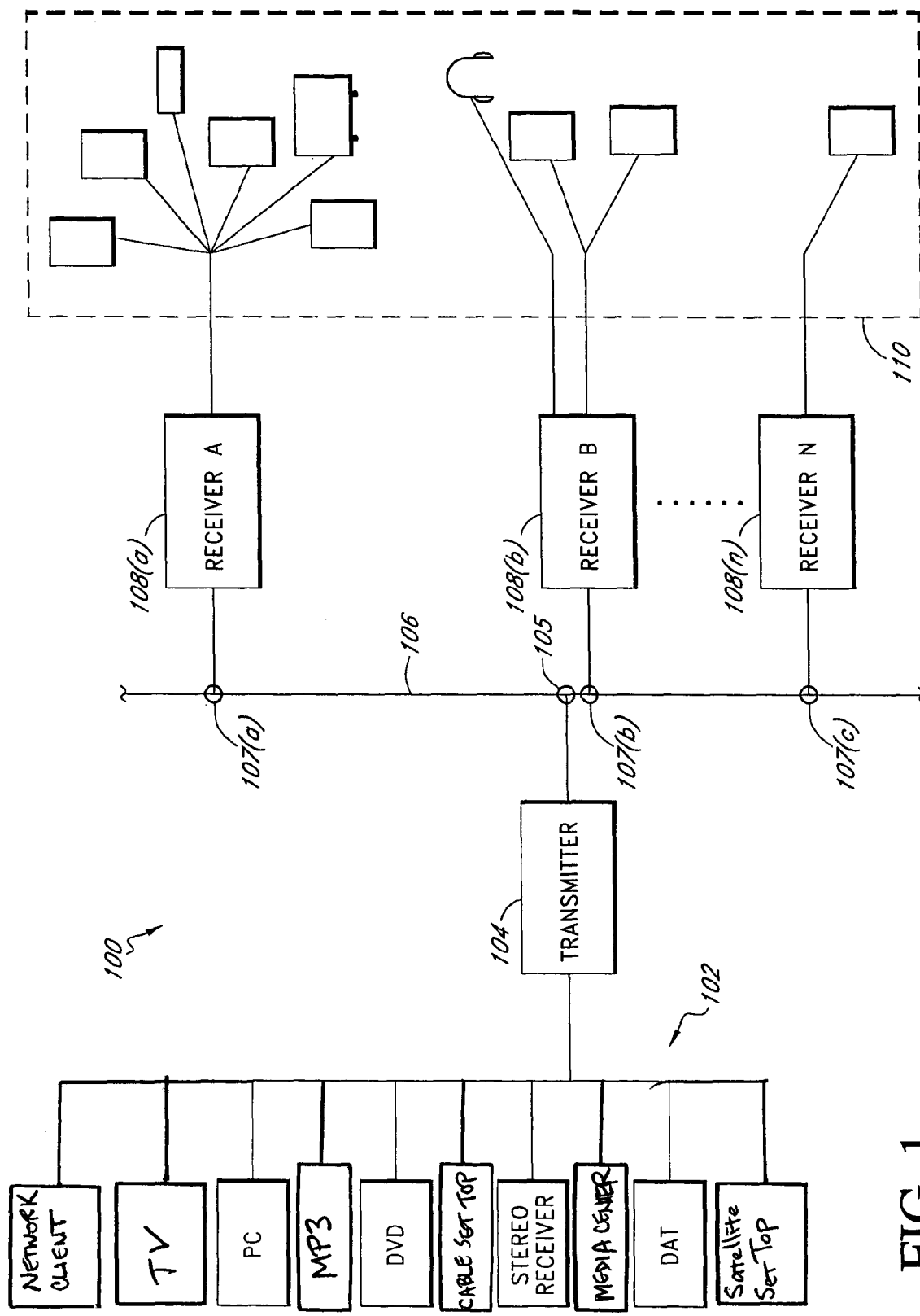
FIG. 1 is a block diagram of a communication system for a home network that can be connected using a wired, wireless, RF, or powerline network.

FIG. 1 is a block diagram of a communication system 100 configured to provide network connectivity throughout a home. The communication system 100 receives an input signal from an input device 102. Types of input signals can include, for example, audio, video, textual, and control signals. These signals can originate from one or more input devices 102 depending on the type of input signal. For ease of explanation, the following description uses an audio signal as an exemplary input signal to the communication system 100. However, the communication system 100 is not so limited and can be used with video, textual, and any other information signal. Examples of input devices 102 that generate an audio signal include a personal computer, digital video disk (DVD) player, a stereo receiver, MP3 player, compact disk (CD) player, digital audio tape (DAT), TV, MP3 player, cable set top, satellite set top, media center, network client, and the like. Examples of control signals include, volume level, fader level, balance level, sub-bass level, destination source, sound processing selection, equalizer levels, power on, power off, or any other manipulation of the audio signal.

Connected to the input devices 102 is a transmitter module 104. Alternatively, the transmitter module 104 may be located within the input device 102. The connection between the input device 102 and the transmitter module 104 can utilized digital or analog specialty cable. The specialty cable combines the signals from the input device 102 into a single cable. The single cable can connect to the rear panel of the input device 102. The transmitter module 104 can be located inside or outside of the input device 102. For example, the transmitter 104 can be located inside the media center, PC, network client, DVD, receiver, MP3 player, and cable set top. The transmitter module 104 receives the audio signal, and any control signals, from the input devices 102. As mentioned above, an exemplary control signal is a desired volume level. The sources of the control signal can include the input device 102. In one embodiment, the transmitter module 104 includes a Digital Signal Processor (DSP) (not shown). The DSP is configured to process and encode the control signal and the audio signal prior to their transmission by the transmitter module 104. For example, the address of a destination receiver module 108(a)-(n) can be encoded by the DSP. Alternatively, control signals can originate at the transmitter module 104. For example, a switch (not shown) can be coupled to the transmitter 104 to allow a user to select the destination receiver module 108(a)-(n) that will receive the audio signal.

The network or transmitter module 104 forms a bridge between the input devices 102 and a network, for example, a powerline medium 106. A powerline network uses an existing infrastructure of alternating current (AC) electrical power outlets in the walls of a home or building to form multiple electrical connections between any two of the power outlets. Power outlets are located almost everywhere someone might want to use a networked device in a home or building. Thus, the powerline network allows a user to remotely connect to the networked device via the existing power outlets. The network in FIG. 1 is a powerline 106 network. However, the communication is not so limited. Other exemplary networks include wireless, infrared, IRDA, and wired networks.

The transmitter module 104 is configured to combine the control signal with the audio signal produced by the input device 102 to form a combined signal. The transmitter module 104 is further configured to modulate the combined signal so as to convert the signals to a form which is compatible with transmission via the powerline 106. An exemplary method for this conversion includes the use of a media access control (MAC) protocol coupled with a physical layer (PHY). The MAC and PHY can utilize data packets for the transmission of the combined signal. The MAC protocol controls the sharing of a PHY layer among multiple transmitters 104 and receivers 108(a)-(n), while the PHY specifies the modulation, coding, and basic packet formats which are used to transmit along the powerline 106. An exemplary transmission technique used by the communication system 100 is orthogonal frequency division multiplexing (OFDM). The detail components which perform the conversion of the combined signal for its transmission via the powerline 106 are illustrated in, and will be explained with reference to, FIG. 5.

Alternatively, the audio signal and the control signal that are converted from an analog to a digital form are formatted at the input source 102 for their transmission. The formatted signals are sent to the network 106 without being processed by the transmitter 104.

The transmitter module 104 can connect with the powerline 106 via input power receptacle 105, such as a standard 3-prong electrical outlet. Alternatively, the transmitter module 104 is directly hard wired to the powerline 106. More detailed block diagrams of the transmitter module 104 are illustrated in, and will be described with reference to, FIGS. 2, 3, and 4. A process for formatting and transmitting a combined signal via the powerline 106, that can be performed by the transmitter module 104 of FIG. 1, is shown in, and will be described with reference to, FIG. 9.

The powerline 106 connects with one or more receiver modules 108(a)-(n) via an output power receptacle 107(a)-(n). The output power receptacle 107(a)-(n) operates in the same fashion as the input power receptacle 105. The output power receptacle 107(a)-(n) directly connects with the receiver module 108(a)-(n) while the input power receptacle 105 directly connects with the transmitter module 104. However, the input and output power receptacles can be cross identified depending on how they are utilized within the powerline communication system 100. For example, input power receptacle 105 can be used by the receiver module 108(a)-(n). Moreover, the input power receptacle 105 can be used simultaneously by the receiver module 108(a)-(n) and the transmitter module 104 to, for example, couple both for use in the same room of the home.

A powerline 106 is a difficult environment for audio signals. The communication path between any two power receptacle 105, 107 in the home can have a complicated transfer function with many branches of the powerline 106 having terminating loads at each receptacle with different impedances. Further, the transfer function can change with time due to the connection or removal of common electrical devices into the powerline 106. Thus, the amplitude and phase response of the powerline 106 can vary widely with frequency.

The network or receiver module 108(a)-(n) is configured to receive the data packets from the powerline 106 and extract the audio signal and the control signal included therein. The detail components which may be used to perform the extraction of the control and audio signals are illustrated in, and will be explained with reference to, FIG. 8.

The receiver module 108(a)-(n) utilizes the control signal to manipulate the audio signal. This manipulation can include, for example, detection of audio signal peaking and clipping. The receiver module 108(a)-(n) may be configured to automatically adjust the audio signal's level to adjust for detection of peaking or clipping. The receiver module 108(a)-(n) may also be configured to receive a code which determines a phase for the audio signal. The receiver 108(a)-(n) then manipulates the audio signal such that a desired phase relationship is maintained with other loudspeakers on the network based on the code. This can be accomplished by coding a time or phase delay in the control signal. More detailed block diagrams of the receiver module 108(a)-(n) are illustrated in, and will be described with reference to, FIGS. 6 and 7. A process for receiving and extracting the audio signal and the control signal from the received combined signal, that can be performed by the receiver module 108(a)-(b) of FIG. 1, is shown in, and will be described with reference to, FIG. 10.

Still referring to FIG. 1, an output device 110 is connected to the receiver module 108(a)-(n) and receives the manipulated audio signal from the receiver module 108(a)-(n). The output device 110 is configured to change the audio signal into sounds loud enough to be heard at a selected distance. Output devices 110 can include, for example, stereo loudspeakers, home theater loudspeakers, and headphones.

As one can now recognize, the communication system 100 of FIG. 1 provides connectivity between the input devices 102 and the output devices 110. As explained above, the network can be wired or wireless. For example, the network can use a wireless data transmission method, such as IrDA, to communicate between the input devices 102 and the output devices 108. IrDA is a standard defined by the IrDA consortium (Infrared Data Association) for both the input and output devices and the protocols they use to communicate with each other. IrDA specifies a way to wirelessly transfer data via infrared radiation using infrared light emitting diodes (IR-LED's). Moreover, a wireless data transmission method, such as radio frequency (RF), can be used for the network. An RF network uses the electromagnetic spectrum associated with radio wave propagation.

The input and output devices can be position at fixed or portable locations within the home. For example, receiver module 108(a) and receiver module 108(b) can be located in different areas of the home while communicating with transmitter module 104. The transmitter module 104 may service a few or several receiver modules 108(a)-(n).

Figure 1A:
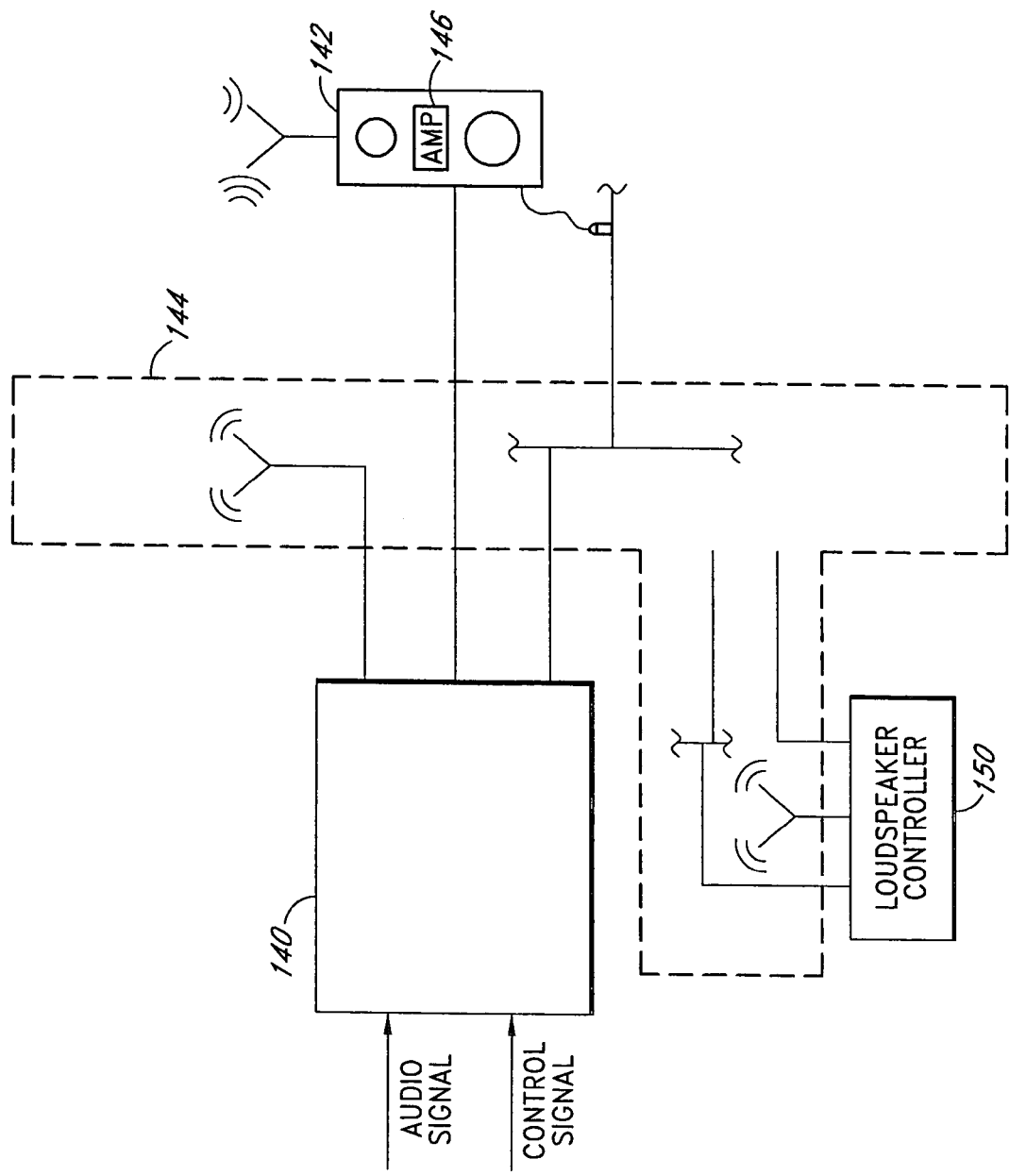
FIG. 1A is a block diagram of an embodiment of the communication system that has a set top box connected to a loudspeaker using a wired, wireless, RF, or powerline network.

FIG. 1A is a block diagram of an embodiment of the communication system that has a set top box 140 connected to a loudspeaker 142 using a wired, wireless, or powerline network. The set top box 140 is configured to combine an audio signal and a control signal. The combined signal is transmitted via the network 144 to the loudspeaker 142.

The loudspeaker 142 is coupled to an amplifier 146. The amplifier 146 may be configured to amplify and/or manipulate the audio signal based on the control signal. The amplifier can thus be further coupled to or incorporate an equalizer (not shown). The equalizer is configured to manipulate the received audio signal prior to the loudspeaker 142 broadcasting the audio signal.

The communication system can further include a loudspeaker controller 150. The loudspeaker controller 150 connects to the network 144 and is configured to manipulate the equalizer of one or more loudspeakers 142. For example, the loudspeaker controller 150 can wirelessly connect to the loudspeaker 142 via the network 144. Alternatively, the loudspeaker controller 150 can connect via a wired network 144 to the loudspeaker 142. The wired network can be, for example, an Ethernet LAN or a powerline network.

The loudspeaker controller 150 can connect to the loudspeaker 142 via a different network than the network 144 utilized by the set top box 140. For example, the set top box 140 can connect to the loudspeaker 142 via the powerline network and the loudspeaker controller 150 connects to the loudspeaker 142 via a wireless network. The settings of the equalizer can be stored in the amplifier 146.

As another example, the loudspeaker controller 150 may connect with the loudspeaker 142 via the Internet or other wide-area network (WAN). In this example, the loudspeaker 142 can include web server software configured to allow the equalizer to receive its settings from the loudspeaker controller 150 via the Internet.

The loudspeaker 142 can further be configured to sense the broadcast signal levels from other loudspeakers. The processing of the sensed signal level may be performed internal to the loudspeaker 142. The sensed signal level is then utilized by the sensing loudspeaker and the other loudspeakers to dynamically adjust the equalizer and signal balance. Alternatively, the sensed signal level is transmitted to the loudspeaker controller 150, host, or other remote processor via the network where adjustments are calculated and transmitted to the loudspeakers.

Figure 2:
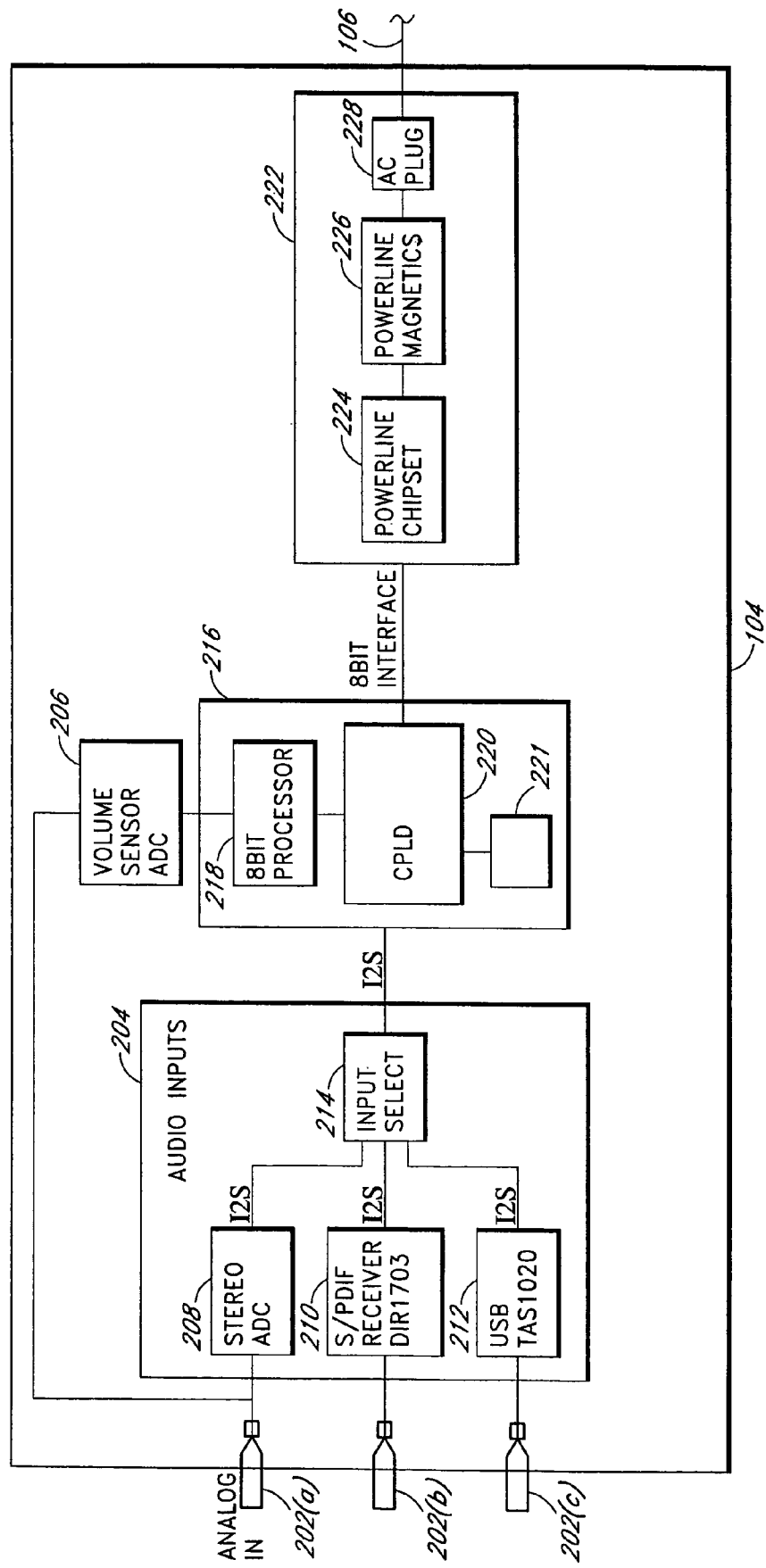
FIG. 2 is a block diagram of a first embodiment of the transmitter module from FIG. 1, which includes a plurality of audio inputs.

FIG. 2 is a block diagram of a first embodiment of the transmitter module 104 from FIG. 1. The transmitter module 104 is configured to receive, format, and transmit a combined signal via the powerline 106. The transmitter module 104 includes receptacles 202(a)-(c), an audio input connector 204, a signal processing module 216, a volume sensor analog to digital converter (A/D) 206 which is coupled to the signal processing module 216, and a powerline module 222. Each of these components is described in detail below.

The audio input connector 204 includes a plurality of connector designs for connecting with different input devices 102. For example, the audio input connectors can include RCA connector module 208, Universal Serial Bus (USB)

module 212, miniplug, S/PDIF module 210, and SACD. The audio input connector 204 can further include any combination of digital and analog receptacles 202(*a*)-(*c*). For example, the RCA connector module 208 can be used to connect an analog stereo receiver to the transmitter module 104. For this connection, the audio input connector 204 is coupled to an analog receptacle 202(*a*) to receive the analog audio signal.

Coupled to the analog connector 202(*a*) is the volume sensor A/D 206. The volume sensor A/D 206 is configured to sense the input power level of the analog audio signal into the analog receptacle 202(*a*) and digitize the input power level. The volume sensor A/D 206 senses a RMS value of the audio signal. Depending on the value, the volume sensor A/D 206 changes the control signal. The sensitivity between changing the control signal in response to changes in the RMS value can vary. The control signal can be in an a variety of future developed formats, such as the well known $I^2C$ format. As explained below, the control signal is transmitted along with the audio signal via the powerline 106 as a combined signal.

The RCA connector module 208 can include an analog to digital converter (A/D). The A/D forms a digital signal from the inputted analog audio signal for its processing by the audio input connector 204.

The S/PDIF module 210 is configured to receive digital signals from the input devices 102 via the receptacle 202(*b*).

The USB connector module 212 is configured to connect the transmitter module 104 with a personal computer to receive a digital audio signal and an associated digital control signal. Since the control signal is in digital form, the volume sensor A/D 206 does not sense the control signal for the USB connector module 212 or the S/PDIF connector module 210. An embodiment of the USB connector module 212 is a Stereo USB Audio Interface, part number TAS1020, which is manufactured by Texas Instruments Incorporated. Texas Instruments Incorporated is located at 12500 TI Boulevard in Dallas, Tex. 75243-4136.

The audio input connector 204 further includes an input selector module 214. The audio input connector 204 is coupled to the RCA connector module 208, the S/PDIF module 210, and the USB connector module 212. The input selector module 214 is configured to select the input device 102 that is to have its audio signal transmitted by the transmitter module 104. The selected input source 102 can dynamically change from time to time.

The input selector module 214 receives digital signals, audio and control, from the selected input devices 102. Various bus designs can be used to couple the input selector module 214 to the input connectors to receive the digital signals. Exemplary bus designs that are used in the audio field include, for example, inter IC sound ($I^2S$).

Connected to the audio input connector 204 is the signal processing module 216. The signal-processing module 216 is configured to combine the digital signal, audio and control, from the input select module 214 with an analog control signal from the volume sensor A/D 206. For input sources 102 that provide a digital audio signal and digital control signal, the analog signal is not used. The control signal and the audio signal for the selected input device 102 forms the combined signal.

The signal processing module 216 includes a processor 218 coupled to the volume sensor A/D 206 for processing analog control signals. The processor 218 can be an 8-bit processor. The processor 218 is configured to control the volume sensor A/D 206. The signal-processing module 216 may further include a programmable logic device (PLD) 220. The PLD 220 is configured to combine the control signal with its associated audio signal. For example, the PLD 220 combines the audio signal from the audio input connector 204 with its associated control signal. The processor 218 can assist in the combining of the audio signal with the control signal. For analog input sources, the digital version of the control signal is provided by the processor 218 using information obtained from the volume sensor A/D 206. The PLD 220 is further configured to format the combined signal to be readable by the powerline module 222.

The signal processing module 216 may also include a destination source switch 221. The destination source switch 221 is configured to select a receiver 108(*a*)-(*n*) for receiving the combined signal. For example in FIG. 1, depending on the position of the destination source switch 221, any of the receivers 108(*a*)-(*n*) could receive the combined signal. Alternatively, more than one receiver 108(*a*)-(*n*) can receive the same combined signal. In one embodiment, the signal processing module 216 includes a digital signal processor (DSP) (not shown). The DSP is configured to process and encode the control signal and the audio signal. For example, the address of the destination receiver module 108(*a*)-(*n*) can be encoded by the DSP.

Coupled to the signal processing module 216 is the powerline module 222. The powerline module 222 is configured to modulate and transmit the combined signal via the powerline 106. The powerline module 222 includes a powerline chipset 224, a powerline magnetics module 226, and an A/C plug 228.

The combined signal is received by the powerline chipset 224 from the signal processing module 216. The powerline chipset 224 is configured to transform the combined signal into symbols. The symbols are then arranged into data packets for their transmission on the PHY via the powerline 106. The PHY can utilize one or more carrier frequencies. The detail components which perform the conversion of the combined signal for its transmission via the powerline 106 are illustrated in, and will be explained with reference to, FIG. 5.

The powerline magnetics module 226 is coupled to the powerline chipset 224. The powerline magnetics module 226 is configured to provide isolation between the low voltage powerline chip set 224 and the high voltage powerline 106. The powerline magnetics module 226 is further coupled to an alternating current (AC) plug 228. The AC plug 228 is configured to electrically connect the transmitter module 104 with the input power receptacle 105 (see FIG. 1) for transmission of the packets.

Figure 3:
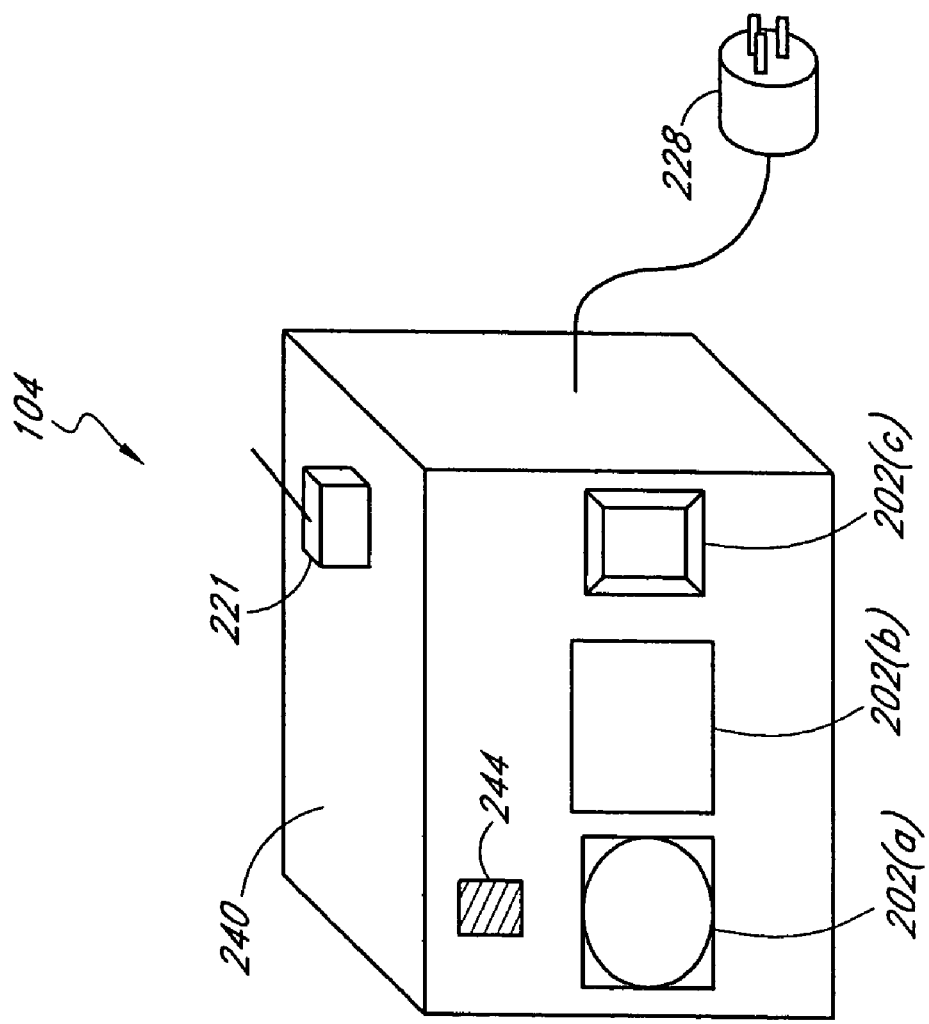
FIG. 3 is a perspective view of the transmitter shown in FIG. 2.

FIG. 3 is a perspective view of the transmitter module 104 shown in FIG. 2. The transmitter module 104 includes housing 240 and a plug 228. The housing includes a plurality of receptacles 202(*a*), (*b*), (*c*) each accessible for attaching a connector from input devices 102 to receive the audio signal. The housing 240 may include a control signal receptacle 244. In this embodiment, the control signal receptacle 244 receives a separate analog or digital control signal from an input device. Alternatively, and as described with reference to FIG. 2 above, a control signal is generated via the analog signal.

Figure 4:
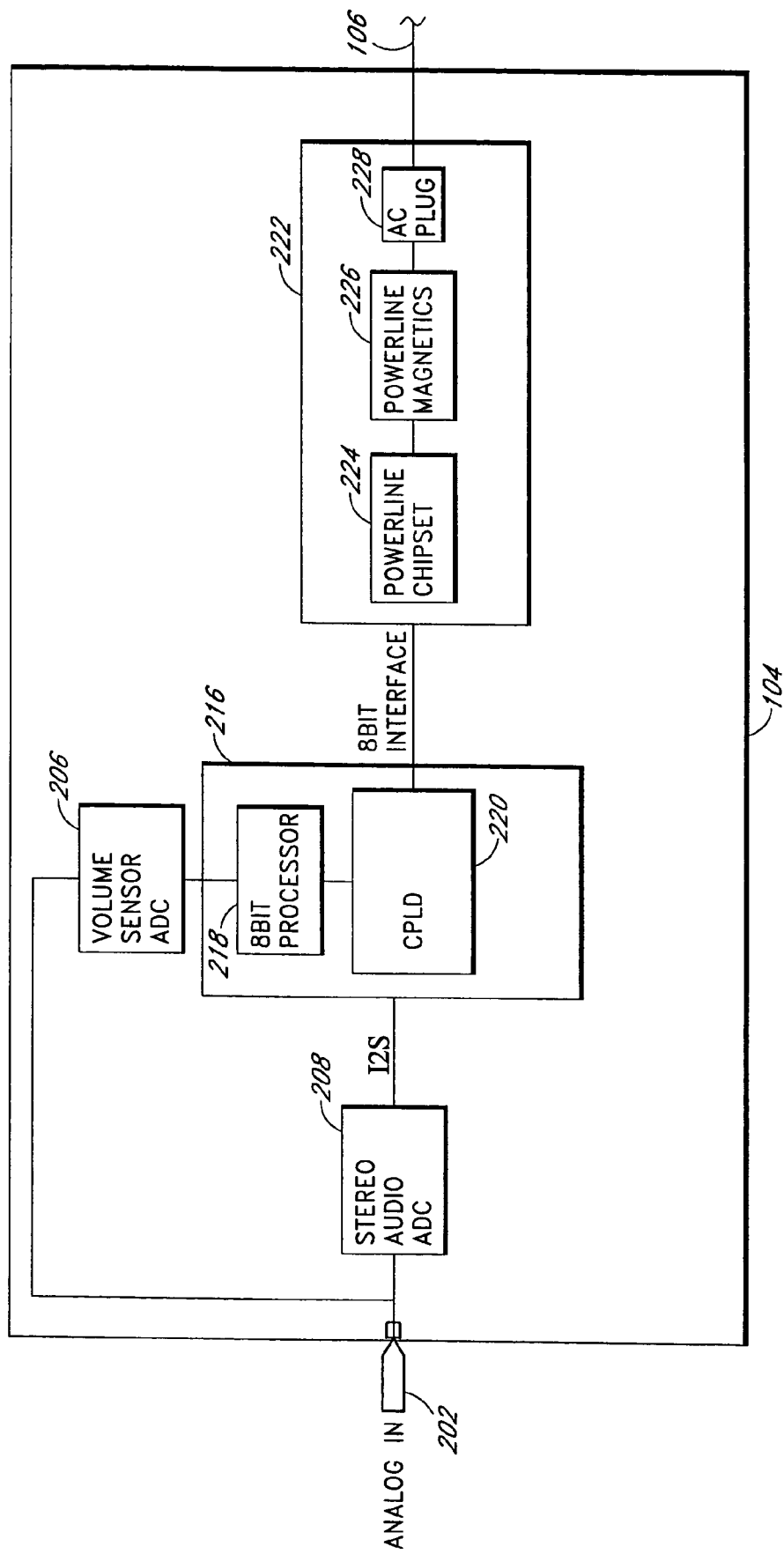
FIG. 4 is a block diagram of a second embodiment of the transmitter module from FIG. 1, which includes a single audio input.

FIG. 4 is a block diagram of a second embodiment of the transmitter module from FIG. 1. In contrast to the first embodiment shown in FIG. 3, the embodiment of FIG. 4 is specifically designed for receiving signals from analog input devices. Thus, FIG. 4 includes only the RCA connector module 208 from FIG. 3 for receiving input signals.

Figure 5:
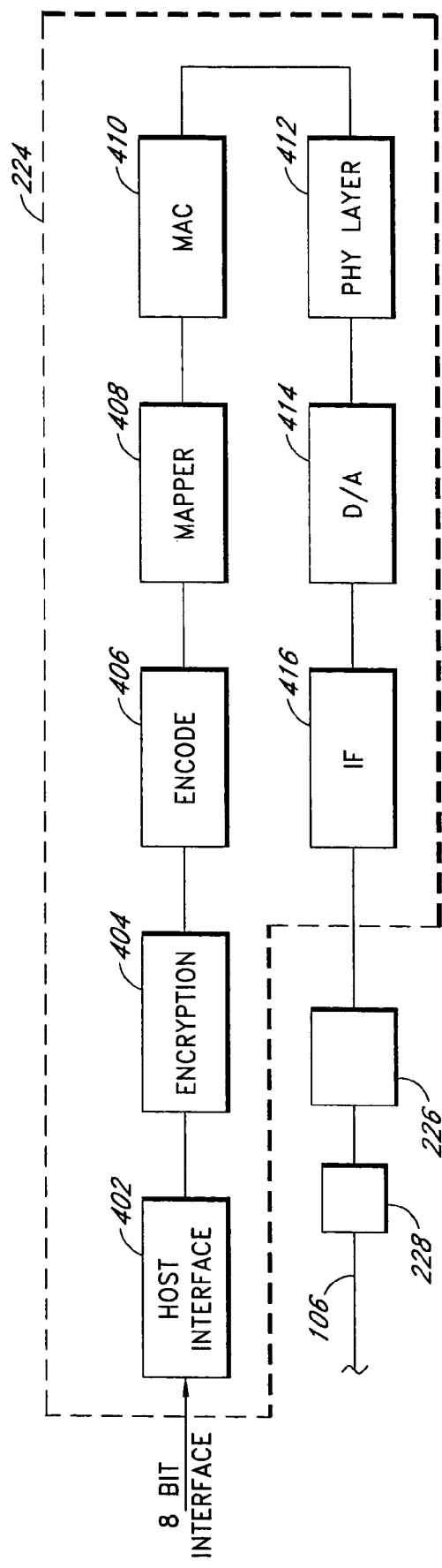
FIG. 5 is a block diagram of an Tx powerline module from FIG. 2.

FIG. 5 is a block diagram of the powerline chipset 224, from FIG. 2, which performs the conversion of the combined signal for its transmission via the powerline 106. The detail components of the powerline chipset 224 are described below.

The powerline chipset 224 receives the combined signal from the signal-processing module 216 via a host interface 402. The encryption module 404 receives the combined signal from the host interface 402. The encryption module 404 is configured to encrypt the combined signal so that it is unreadable except by authorized users, for example, a receiver 108 (a)-(n). Coupled to the encryption module 404 is an encode module 406. The encode module 406 is configured to encode the combined signal. Exemplary encoding techniques include Reed-Solomon encoding.

A media access control (MAC) protocol 410 controls the sharing of a PHY layer 412 among multiple transmitters 104 and receivers 108(a)-(n). In conjunction with the MAC protocol 410, the PHY layer 412 specifies the modulation, coding, and basic packet formats which are used to transmit along the powerline 106. An exemplary transmission technique used by the powerline communication system 100 is orthogonal frequency division multiplexing (OFDM).

OFDM divides the encoded signal into multiple parallel signals, each of which has a relatively low bit rate. Each encoded signal is provided to the mapper module 408. The mapper module 408 converts the bits to symbols prior to their modulation on the PHY layer 412. For example, the bit streams can form OFDM symbols. Alternatively, QAM symbols can be used.

The MAC protocol 410 arranges each series of symbols to form a payload for transmission in a data packet. Each payload can be associated with a frame control header. The frame control header includes MAC protocol 410 management information. For example, the packet's length and response status can be included in the frame control header. The data packet can further include a start-of-frame delimiter and an end-of-frame delimiter in addition to the payload and frame control header. For unicast transmissions to more than one receiver 108(a)-(n), the destination receiver 108 (a)-(n) can respond by transmitting a response delimiter indicating the status of its reception. As mentioned above, the delimiters can be intended for more than one of the receiver modules 108 (a)-(n). However, the payload is intended for only the destination receiver module 108(a)-(n).

Each data packet is then modulated one of a series of closely spaced carriers, or subcarriers of the PHY layer 412, using, for example, OFDM. Many different types of modulation can be used to transmit the symbols on the individual carriers. Exemplary modulation techniques include differential quadrature phase shift keying (DQPSK) modulation and quadrature amplitude modulation (QAM), both well known in the art. DQPSK modulation encodes the data as the difference in phase between the present and previous symbol in time on the same subcarrier.

The payload is carried on subcarriers that have been previously agreed upon by the transmitter module 104 and destination receiver module 108(a)-(n) during a channel adaptation procedure. The subcarriers are selected based on the transfer function between the transmitter module 104 and the receiver module 108(a)-(n). For example, the transmitter module 104 could select a first set of subcarriers of the PHY layer 412 for transmission between itself and the receiver module 108(a). The receiver module 104 could then select a different set of subcarriers of the PHY layer 412 for transmission between itself and receiver module (b) based on the transfer functions between itself and receiver modules 108 (a), 108(b).

A digital to analog module 414 converts the modulated signal to an analog form. The outgoing signal is then upconverted to an intermediate frequency 416 prior to its transmission.

Figure 6:
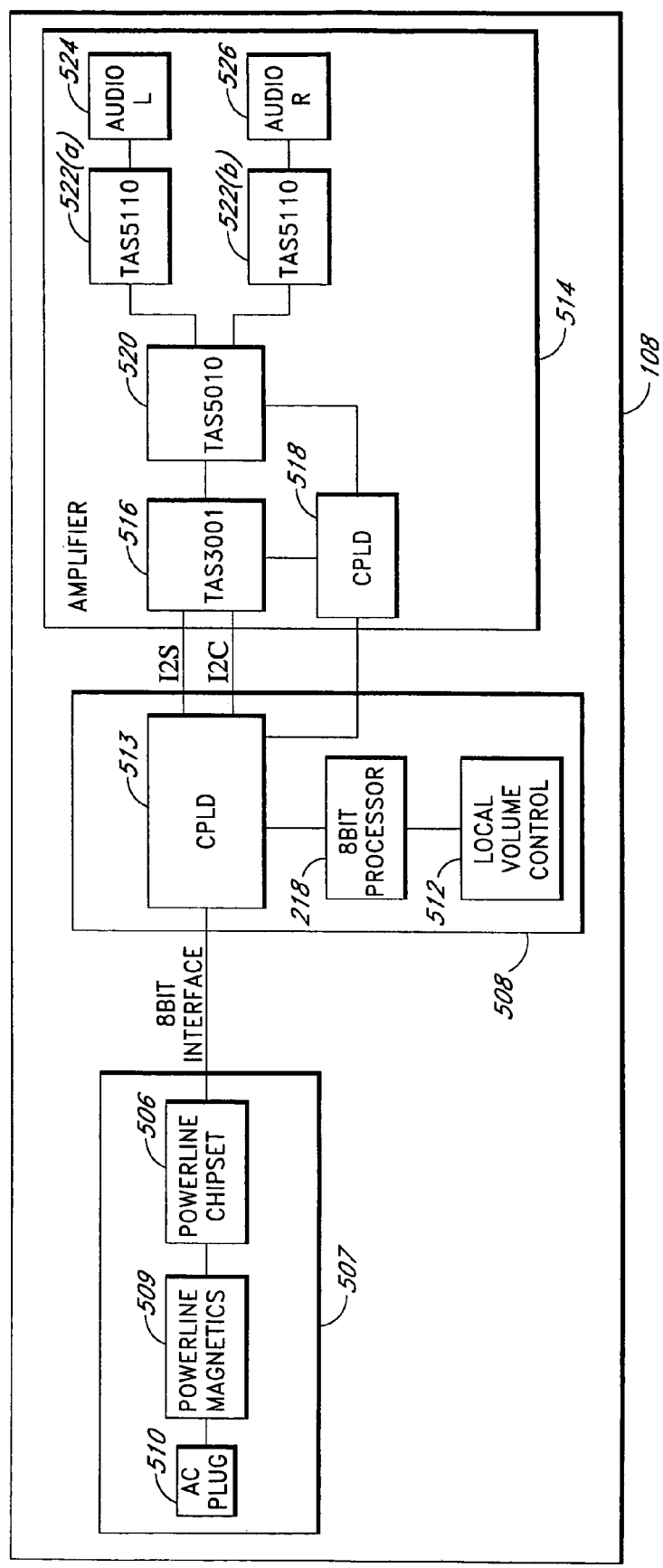
FIG. 6 is a block diagram of a first embodiment of the receiver module from FIG. 1, which includes an amplifier.

FIG. 6 is a block diagram of a first embodiment of the receiver module from FIG. 1, which includes an amplifier 514. The amplifier 514 can be a digital amplifier. Digital amplifiers internally process the audio signal in the digital domain. The receiver module 108 is configured to receive and unformat a combined signal received via the powerline 106. The receiver module 108 is further configured to manipulate and amplify the audio signal and then broadcast the amplified signal.

The receiver module 108 includes a powerline module 507, a signal processing module 508, and an amplifier module 514. The powerline module 507 is similar to the powerline module 222 described with reference to FIG. 2 except that it operates in a reverse configuration. The powerline module 507 is configured to receive and demodulate the combined signal via the powerline 106. The powerline module 507 includes a powerline chipset 506, a powerline magnetics module 509, and an A/C plug 510.

The alternating current (AC) plug 510 is configured to electrically connect the receiver module 108 with an input power receptacle 107(a)-(c) (see FIG. 1) to receive the packets. The AC plug 228 is further coupled to the powerline magnetics module 509. The powerline magnetics module 509 is configured to provide isolation between the low voltage powerline chip set 506 and the high voltage powerline 106. The powerline magnetics module 509 is coupled to the powerline chipset 506.

The symbols in the data packets are received by the powerline chipset 506. After their transmission on the PHY via the powerline 106, the symbols are removed from the data packets. The powerline chipset 506 is configured to transform the symbols into a combined signal. The detail components which perform the conversion of the data packets received via the powerline 106 are illustrated in, and will be explained with reference to, FIG. 8.

The signal processing module 508 is similar to the signal processing module 216 described with reference to FIG. 2 except that it receives the combined signal and extracts the audio signal from the control signal. The signal processing module 508 includes a processor 218. The processor 218 is coupled to a local volume control 512. The local volume control 512 is configured to allow a user to change the volume level of the audio signal broadcast by the loudspeaker. The signal-processing module 508 further includes a programmable logic device (PLD) 513. The PLD 513 is configured to extract or separate the control signal from its associated audio signal. The processor 218 can assist in separating the audio signal from the control signal. The audio signal can be in an I²S format while the control signal can be in an I²C format. The PLD 513 provides the signals to the amplifier 514.

Coupled to the signal-processing module 508 is the amplifier 514. The amplifier 514 receives the extracted audio signal and control signal from the signal-processing module 508. The amplifier 514 is configured to manipulate and amplify the audio signal and then broadcast the amplified signal. The amplifier includes a digital signal processor (DSP) module 516, an amplifier module 520, a power stage module 522(a)-(b), and outputs 524, 526.

The DSP module 516 is configured to manipulate the received audio signal based on the control signal associated with the received audio signal. The DSP module 516 can include a graphical user interface (GUI) for a user to control the DSP module 516. A PLD 518 can be coupled to the DSP module 516 to provide control logic. This logic can include processing additional channels, for example, subwoofer and center channels, for the amplifier 514. For example, the PLD 518 can create a delay in sending a center channel signal to the DSP module 516. An embodiment of the DSP module 516 is a Stereo Audio Digital Equalizer, part number TAS3001, which is manufactured by Texas Instruments Incorporated. Texas Instruments Incorporated is located at 12500 TI Boulevard in Dallas, Tex. 75243-4136.

The amplifier module 520 is coupled to the DSP module 516 and receives the manipulated $I^2S$ audio signal. The amplifier module 520 converts the $I^2S$ audio signal to a pulse width modulation (PWM) signal. An embodiment of the amplifier module 520 is a Digital Audio PWM Processor, part number TAS5010, which is manufactured by Texas Instruments Incorporated. The PWM signal is amplified by the power stages 522(a)-(b). An embodiment of the power stages 522 is a Digital Amplifier Power Stage, part number TAS5110, which is manufactured by Texas Instruments Incorporated. The amplified signal is broadcast via outputs 524, 526.

Figure 7:
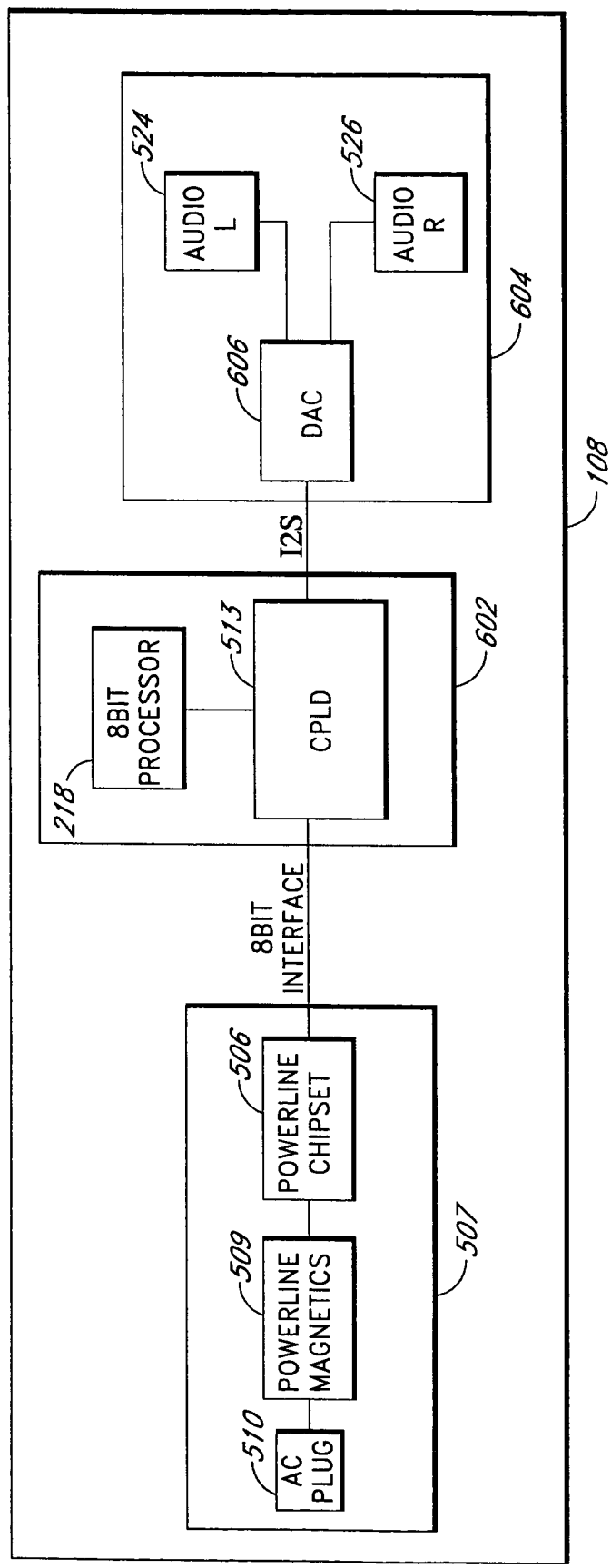
FIG. 7 is a block diagram of a second embodiment of the receiver module from FIG. 1.

FIG. 7 is a block diagram of a second embodiment of the receiver module 108 from FIG. 1. The second embodiment is similar to the first embodiment except that the signal-processing module 602 does not provide an $I^2C$ control signal. Moreover, the embodiment of FIG. 7 provides the $I^2S$ signal to an output module 604 and not to an amplifier. The output module 604 converts the $I^2S$ signal to an analog form for broadcast via outputs 524, 526.

Figure 8:
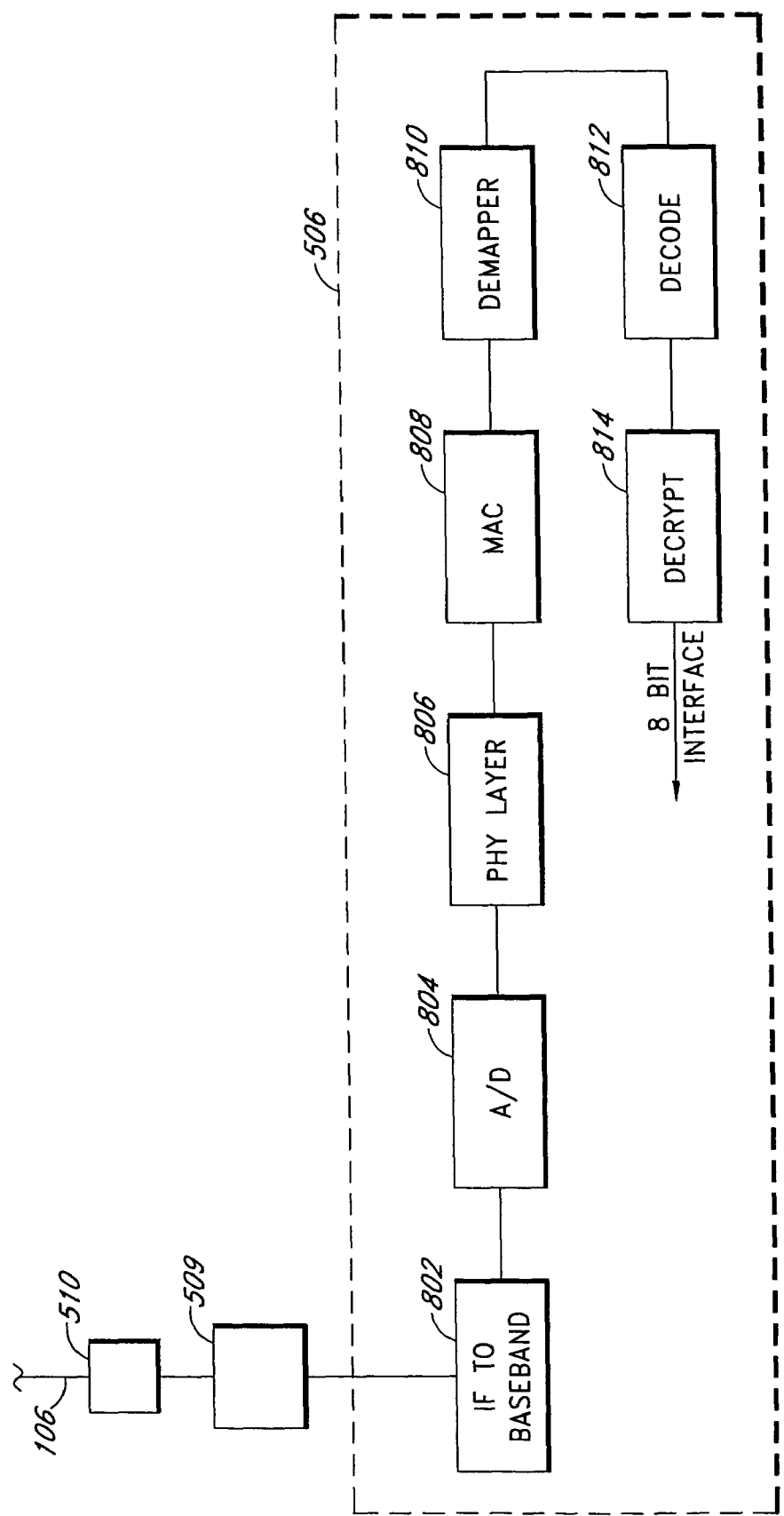
FIG. 8 is a block diagram of an Rx powerline module from FIG. 6.

FIG. 8 is a block diagram of the Rx powerline chipset 506 from FIG. 6. The Rx powerline chipset 506 operates similar to the Tx powerline chipset described in FIG. 5 except in a reverse configuration. The Rx powerline chipset 506 performs the conversion of the combined signal received via the powerline 106. The detail components of the Rx powerline chipset 506 are described below.

The incoming signal is downconverted from an intermediate frequency 802 to a baseband signal. An analog to digital module 804 converts the baseband signal to a digital form. The received data packet is demodulated from one of a series of closely spaced carriers, or subcarriers of the PHY layer 806. Many different types of modulation can be used to transmit the symbols on the individual carriers. Exemplary modulation techniques include differential quadrature phase shift keying (DQPSK) modulation and quadrature amplitude modulation (QAM), both well known in the art. DQPSK modulation encodes the data as the difference in phase between the present and previous symbol in time on the same subcarrier.

A media access control (MAC) protocol 808 controls the sharing of the PHY layer 806 among multiple transmitters 104 and receivers 108(a)-(n). In conjunction with the MAC protocol 808, the PHY layer 806 identifies the modulation, coding, and basic packet formats which were used to transmit along the powerline 106.

The MAC protocol 808 removes the symbols from the received data packet. Each data packet can be associated with a frame control header. The frame control header includes MAC protocol 808 management information. For example, the packet's length and response status can be included in the frame control header. The data packet can further include a start-of-frame delimiter and an end-of-frame delimiter in addition to the payload and frame control header. For unicast broadcast to more than one receiver 108(a)-(n), the destination receiver 108 (a)-(n) can respond by transmitting a response delimiter indicating the status of its reception. As mentioned above, the delimiters can be intended for more than one of the receiver modules 108(a)-(n). However, the payload is intended for only the destination receiver module 108(a)-(n).

The symbols are provided to the demapper 810. The demapper module 810 converts the demodulated symbols to bits. The bits are provided to a decode module 812. The decode module 812 is configured to decode the bits into a combined signal. Exemplary encoding techniques include Reed-Solomon encoding. Coupled to the dencode module 812 is a decryption module 814. The decryption module 814 receives the combined signal from the decode module 812. The decryption module 814 is configured to decrypt the combined signal so that it is readable by the authorized user, for example, the receiver 108 (a). once decrypted, the powerline chipset 506 provides the combined signal to the signal-processing module 508.

Figure 9:
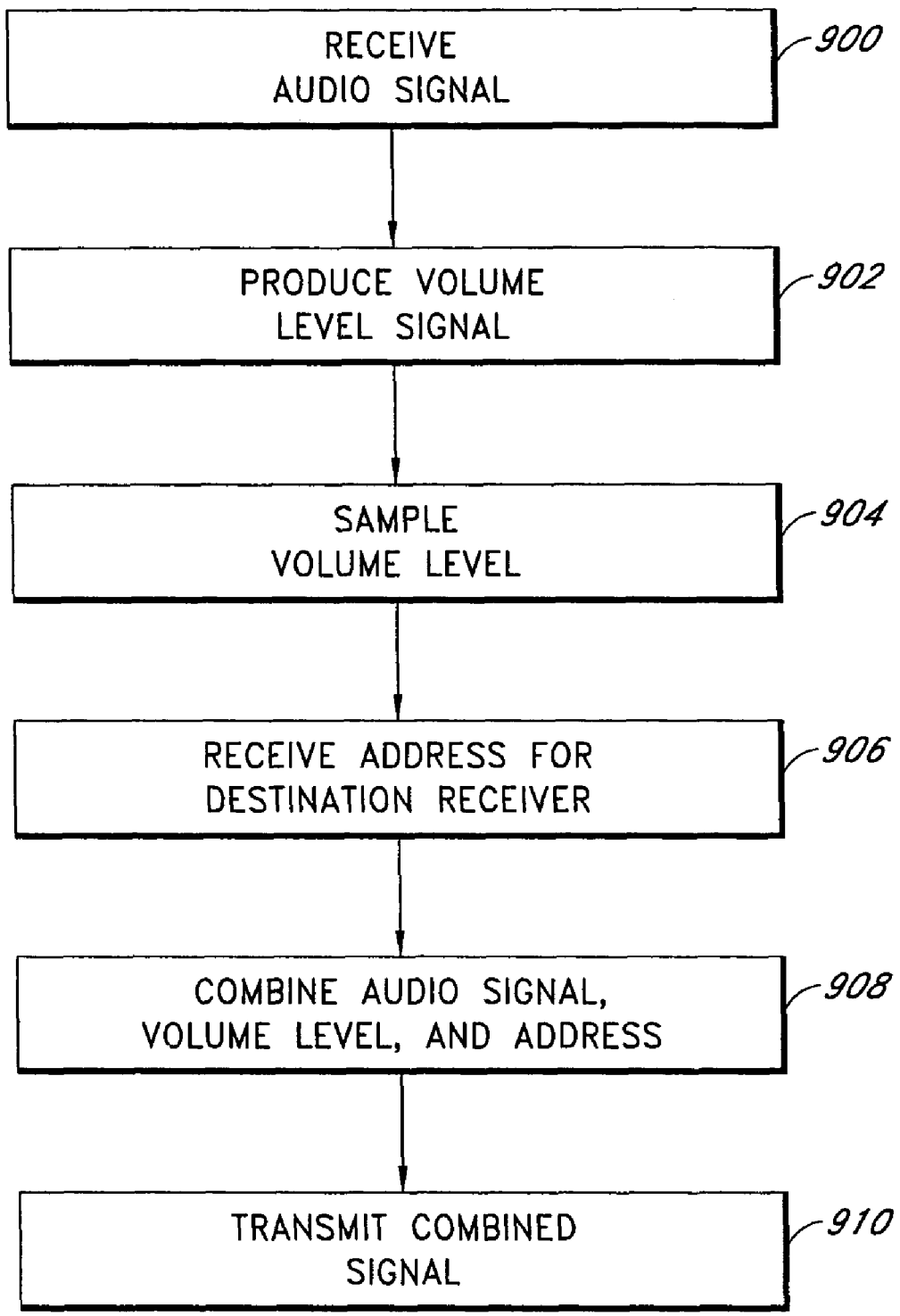
FIG. 9 is a flowchart of an exemplary process that is performed by the transmitter module to transmit a Tx signal and a Tx control signal into a powerline network.

FIG. 9 is a flowchart of an exemplary process that is performed by the transmitter module to transmit a Tx signal and a Tx control signal into the powerline 106 when the input is an analog audio signal. The process begins at a state 900 where the signal-processing module 216 receives an audio signal from the audio input connector 204. The process then moves to a state 902 where the analog audio signal is processes through, for example, low pass filtering or other additional signal processing to produce an analog volume signal level. The process moves to a state 904 where the volume sensor A/D 206 periodically samples the sensed volume and converts the sensed volume into a digital form. Next, at a state 906, the signal-processing module 216 receives the destination address of the receiver 108(a)-(n) from the destination source switch 221. Flow proceeds to a state 908 where the signal processing module 216 combines the audio and control signal into a combined signal. At a state 912, the powerline module 222 transmits the combined signal via the powerline 106 to the destination receiver (a)-(n).

Figure 10:
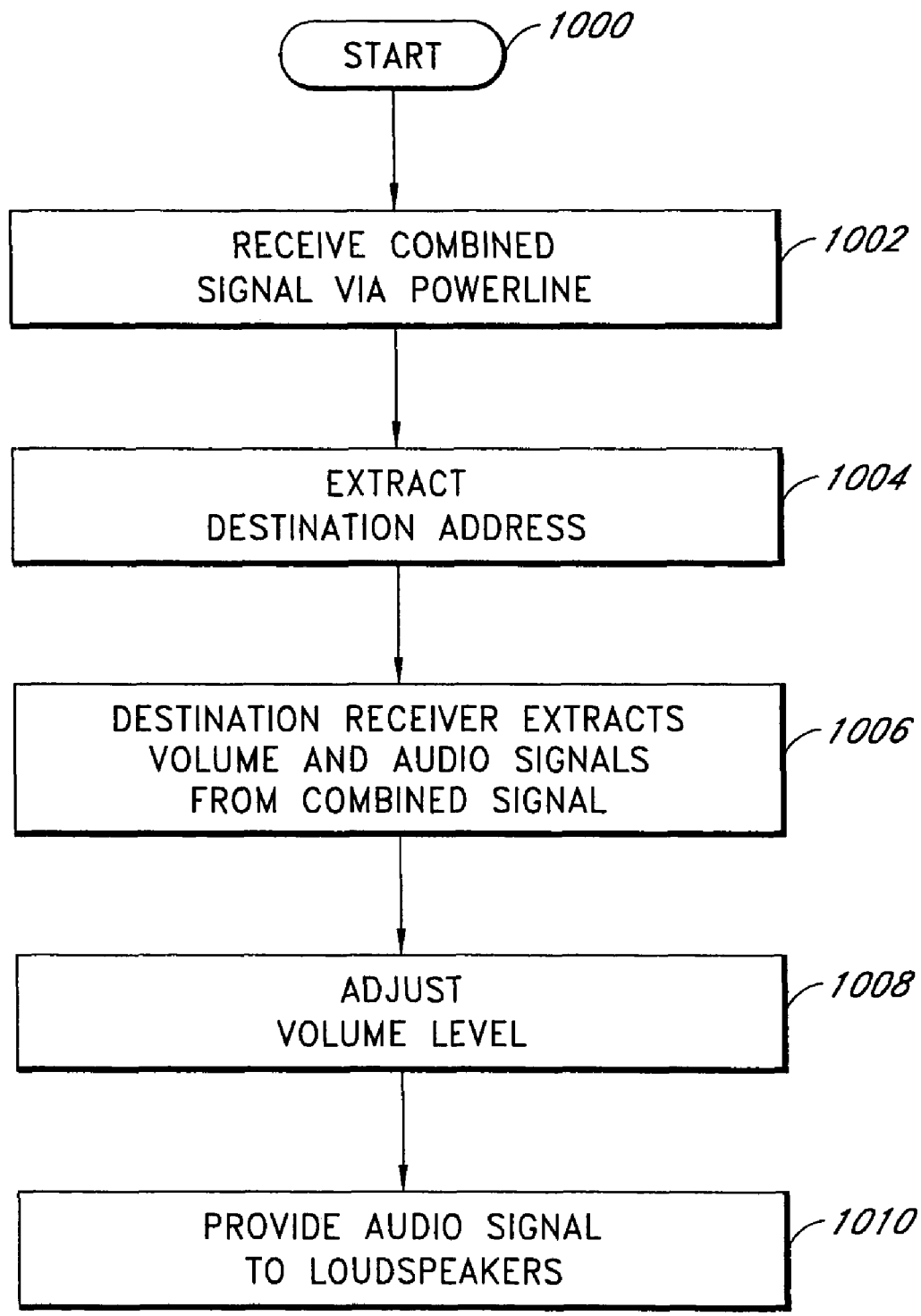
FIG. 10 is a flowchart of an exemplary process that is performed by the receiver module to receive an Rx signal and an Rx control signal from the transmitter module via the powerline network.

FIG. 10 is a flowchart of an exemplary process that is performed by a receiver module to receive an Rx signal and an Rx control signal from the transmitter module via the powerline 106. The process begins at a state 1000 where the combined signal is received by a destination receiver module via the powerline. The process moves to a state 1002 where the destination receiver module extracts its destination address from the combined signal. Flow moves to a state 1006 where the destination receiver extracts volume and audio signals from the combined signal. Next, at a state 1008, the receiver module adjusts the volume level of the audio signal based on the volume signal. Flow proceeds to a state 1010 where the receiver module provides the adjusted audio signal to the loudspeaker.

FIGS. 11-14 illustrate embodiments of the communication system that are configured to utilize an infrared (IR) transmission and reception technique to communicate within the network. However, the communication system is not so limited. Other exemplary transmission and reception techniques that are within the scope of the invention comprise wireless, powerline, RF, and wired techniques. Thus, the following description equally applies to communication systems that use techniques besides IR as well as communication systems that use a combination of techniques within the network.

Figure 11:
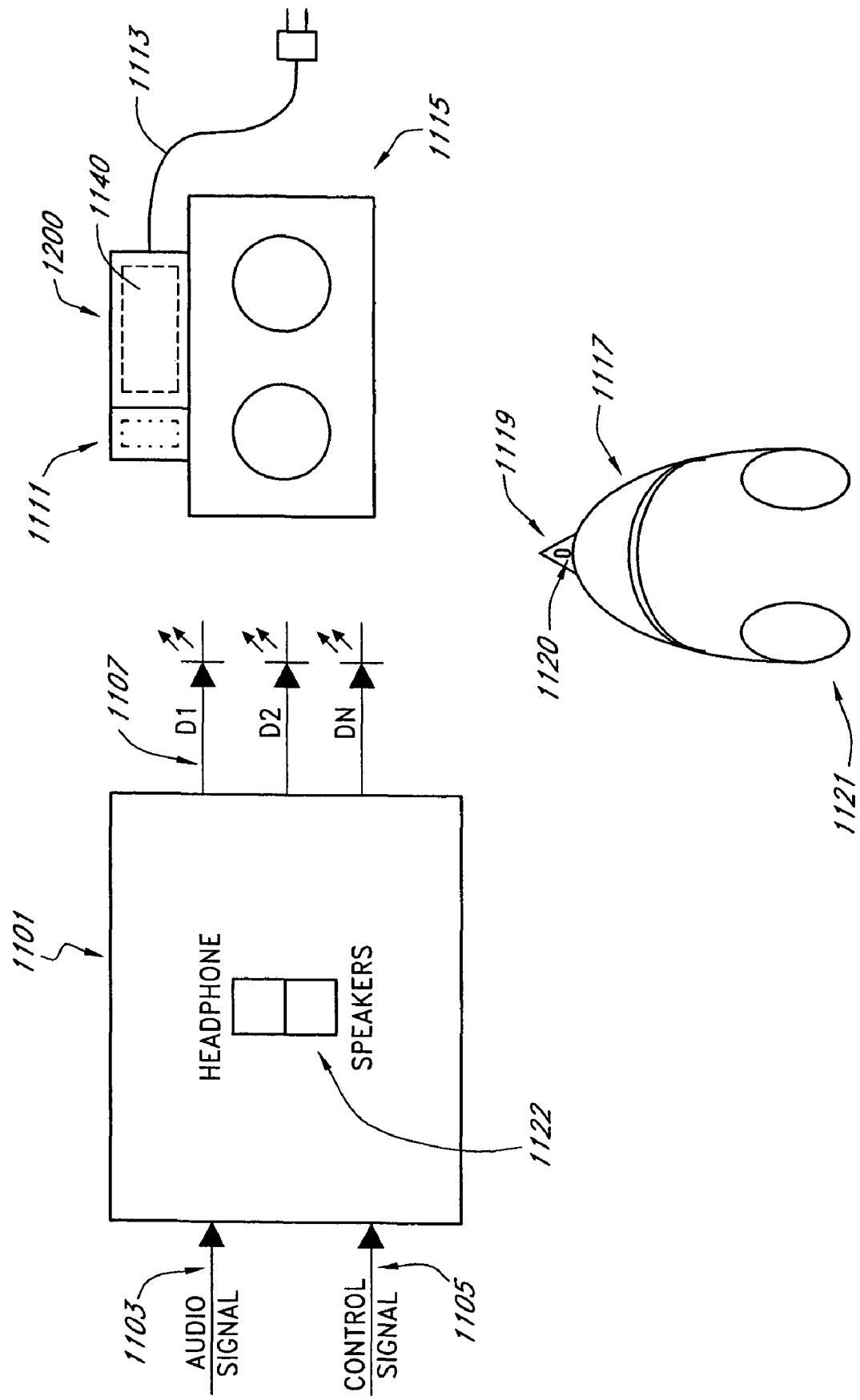
FIG. 11 is a block diagram of an embodiment of a communication system that utilizes a wireless network, for example, an infrared (IR) network.

FIG. 11 is a block diagram of one embodiment of a communication system showing an infrared (IR) transmitter 1101 and a loudspeaker 1115 connected using an IR network. The IR transmitter 1101 is configured to combine an audio signal 1103 and a control signal 1105. Alternatively, the control signal 1105 is sensed via the audio signal 1103. The IR transmitter 1101 can include one or more diodes 1107. The diode 1107 is configured to transmit the combined signal in the infrared spectrum of electromagnetic radiation. In one embodiment, the combined signal is transmitted via the IR network to the loudspeaker 1115.

The loudspeaker 1115 can be coupled to a housing 1200. The housing includes one or more receiver components 1140, an IR detector 1111, and a power supply 1113. The receiver components 1140 are configured to receive the combined signal that is transmitted by the IR transmitter 1101. The receiver components 1140 provide the received combined signal to the loudspeaker 1115. As illustrated in FIG. 11, the housing 1200 includes one IR detector 1111. However, the housing can include additional IR detectors 1111. The IR detector 1111 is configured to receive the transmitted combined signal from the IR transmitter 1101. In another embodiment, the receiver components 1140 and the IR detector 1111 are incorporated within the loudspeaker 1115. In such a configuration, the IR detector 1111 can be incorporated into the external surface of the loudspeaker 1115. In still another embodiment, the IR detector 1111 is located external to the loudspeaker and coupled through the loudspeaker 1115 to internal receiver components.

In one embodiment, the IR transmitter 1101 is coupled to a headphone 1117 via the IR network. In this configuration, the IR transmitter 1101 transmits the combined signal via the diode 1107 to the headphone 1117. The transmitter is configured with a switch 1122 to create an address to enable operation of the speakers or headphones. For example, when the switch 1122 is set to headphones, only the headphones will play. When the switch 1122 is set to speakers, only the speakers receiving the audio signal will play. The switching can be accomplished by many alternative means such as by creating an address that will be transmitted along with the audio signal. The headphone 1117 can include receiver components 1119, one or more detectors 1120, and one or more loudspeakers 1121. The detector 1120 is configured to receive the combined signal from the IR transmitter 1101. The detector 1120 further provides the combined signal to the receiver components 1119. In one embodiment, a housing for the receiver components 1119 is shaped like a pyramid with detectors 1120 located on each of its four sides. In one embodiment, the receiver components 1119 are combined with the loudspeaker 1121 of the headphone 1117. As will be recognized by one skilled in the art, various combinations of these components can be selected while staying within the scope of the invention.

As explained above with reference to FIG. 1, the IR network of FIG. 11 can provide the combined signal to the loudspeaker 1115 and/or the headphone 1117 for a listener's enjoyment. In one embodiment, the receiver components of the system 1109 manipulates the audio signal portion of the combined signal based on the associated control signal prior to the audio signal's broadcast by the loudspeaker 1115. Similarly, the receiver components 1119 of the headphone 1117 can manipulate the audio signal portion of the combined signal based on the associated control signal prior to the audio signal's broadcast via the loudspeaker 1121 to the user.

Figure 11A:
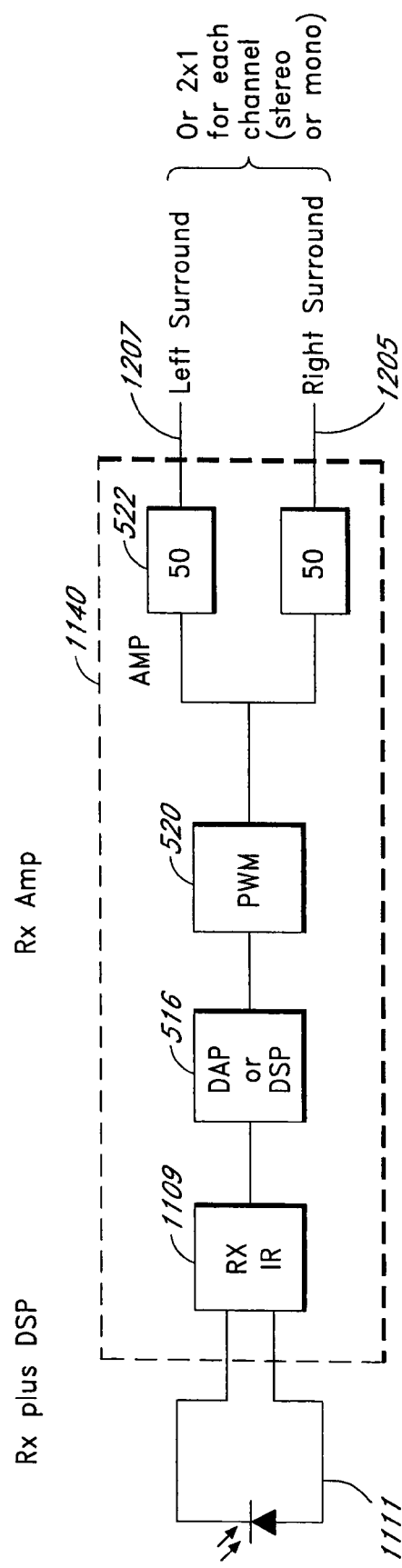
FIG. 11A is a block diagram of receiver components which can be located in a surround or speaker enclosure.

FIG. 11A is a block diagram of receiver components 1140 which can be located in a surround or speaker enclosure. The receiver components 1140 can comprise an IR receiver 1109, a DSP module 516 for multiple channels, an amplifier module 520, and power stage modules 522 for one or more surround or speaker channels. The IR receiver 1109 receives the transmitted audio signal from the IR detector 1111. The DSP module 516 processes the audio signal using any control information that was transmitted with the audio signal. The DSP module 516 can further enhance the signal using signal processing techniques known in the art. The amplifier module 520 can be configured as a pulse width modulation (PWM) converter/amplifier driven directly from a digital input from the DAP/DSP. The power stage modules 522 receive the audio power signal from the amplifier module 520 and provides the audio signal to the audio output lines 1205, 1207. The audio output lines provide the manipulated audio signal to one or more surround or speaker enclosures. The surround or speaker enclosure and associated receiver components 1140 can be configured to operate in mono or stereo depending on the system requirements.

FIG. 11B is a diagram showing multiple embodiments of a housing or speaker 1150 and associated receiver components 1140 from FIG. 11A. One embodiment of the speaker is a housing for a surround speaker. However, as illustrated in FIGS. 11B(1)-(5), the invention is not so limited. In the embodiment illustrated by FIG. 11B(1), the receiver components 1140 are mounted inside a speaker enclosure 1150. This enclosure can be any speaker. In the embodiment illustrated by FIG. 11B(2), the receiver components are mounted inside a stereo speaker 1150, all in one housing. One or more of the receiver components 1140 are mounted inside the enclosure. The receiver components may include signal processing techniques to enhance the audio signal to give the listener the impression of a wider separation of sound.

In the embodiment illustrated by FIG. 11B(3), the receiver components 1140 are mounted in various possible locations within a speaker stand. This embodiment integrates the stand and the receiver components. A user can advantageously select any standard speaker to receive the audio signal from receiver speaker outputs. The stand can be configured to operate in a mono or stereo mode. In the embodiment illustrated by FIG. 11B(4), the housing for the receiver is incorporated in a speaker wall mount. In this embodiment, the receiver housing, mount, and receiver components are integrated. As explained above with FIG. 11B(3), any standard speaker receives the audio signal from the receiver speaker outputs and is further mounted on the bracket. In the embodiment illustrated by FIG. 11B(5), the housing for the receiver components is wall mounted, floor mounted or mounted on a speaker. As explained above with FIG. 11B(3), any standard speaker receives the audio signal from the receiver speaker outputs.

The embodiments of FIG. 11B(1) and FIG. 11B(2) form complete speaker systems where the receiver components are integral with the speaker. The embodiments of FIGS. 11B(3), 11B(4) and 11B(5) are adapter systems which allow the user to transform any speaker system into a wireless system. This advantageously allows the user to incorporate the receiver components disclosed herein with a home entertainment system's pre-existing loudspeakers. Moreover, should the user decide to purchase new loudspeakers, the user may select from a myriad of speaker manufacturers and speaker designs for attachment to the receiver components.

The receiver components 1140 illustrated in FIGS. 11B(1) and 11B(2) can be configured to operate in a stereo or mono mode. In a preferred embodiment, the receiver components 1140 comprise the receiver module 1109, PWM amplifier 520, power stage modules 522, and power supply. The receiver components 1140 may or may not include DSP 516 and signal processing depending on the application.

The transmitter which transmits the audio signal to the loudspeakers shown in FIG. 11B can be mounted inside another speaker. For example, the transmitting speaker can be a center channel or other speaker. This is most likely to be a center channel for IR networks but alternatively, the subwoofer loudspeaker, left loudspeaker, right loudspeaker, effects loudspeaker, surround/satellite loudspeaker and the like is used instead of the center channel speaker. In an embodiment where the IR transmitter 1101 is located in a center loudspeaker, the IR transmitter 1101 transmits the signal to the surround or satellite loudspeakers or subwoofer. The transmitter may be combined with one or more digital amplifiers which will be described with reference to FIG. 11C.

Figure 11C:
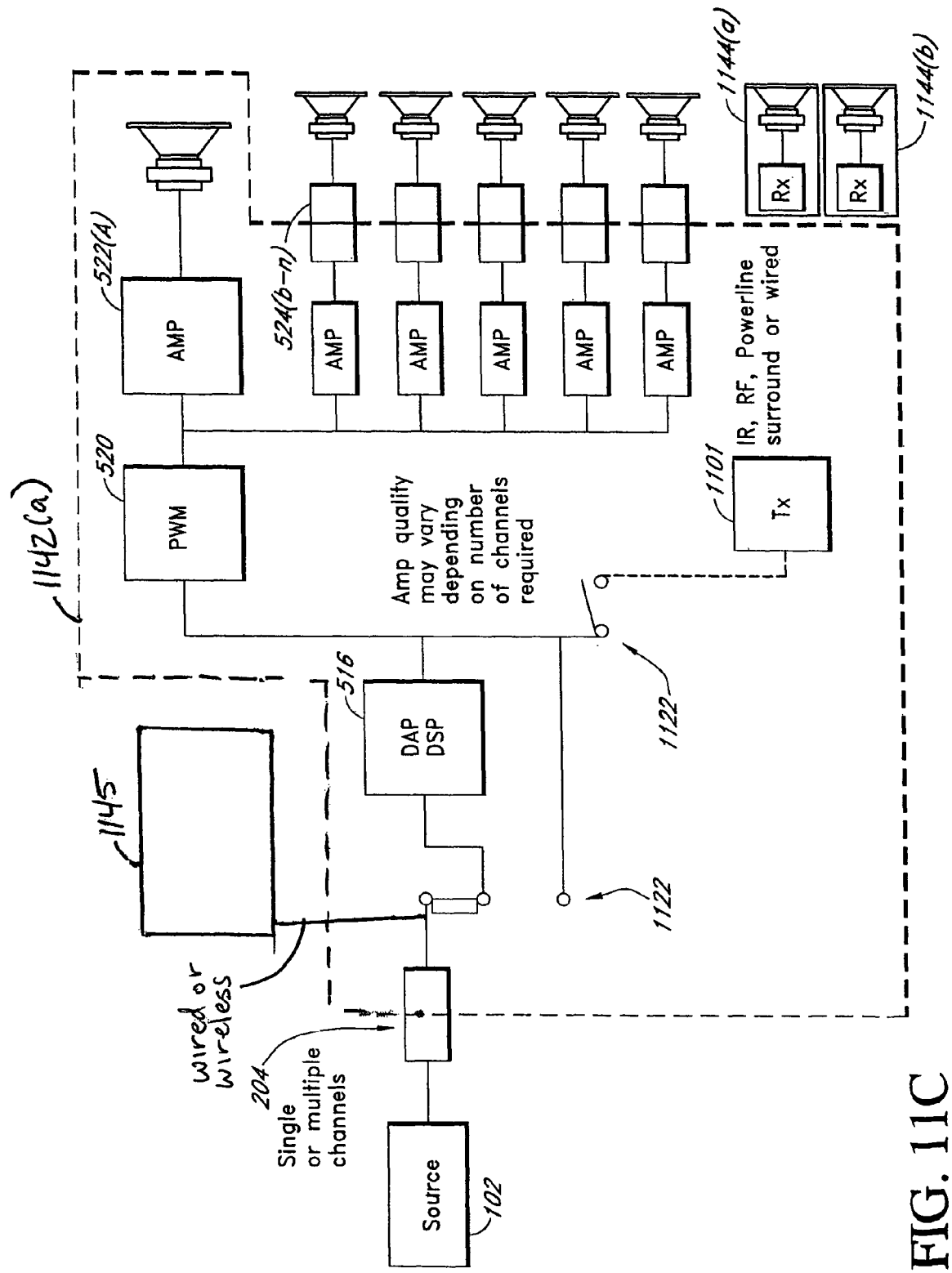
FIG. 11C is a block diagram of signal paths through components of an embodiment of a home entertainment system.
Figure 11D:
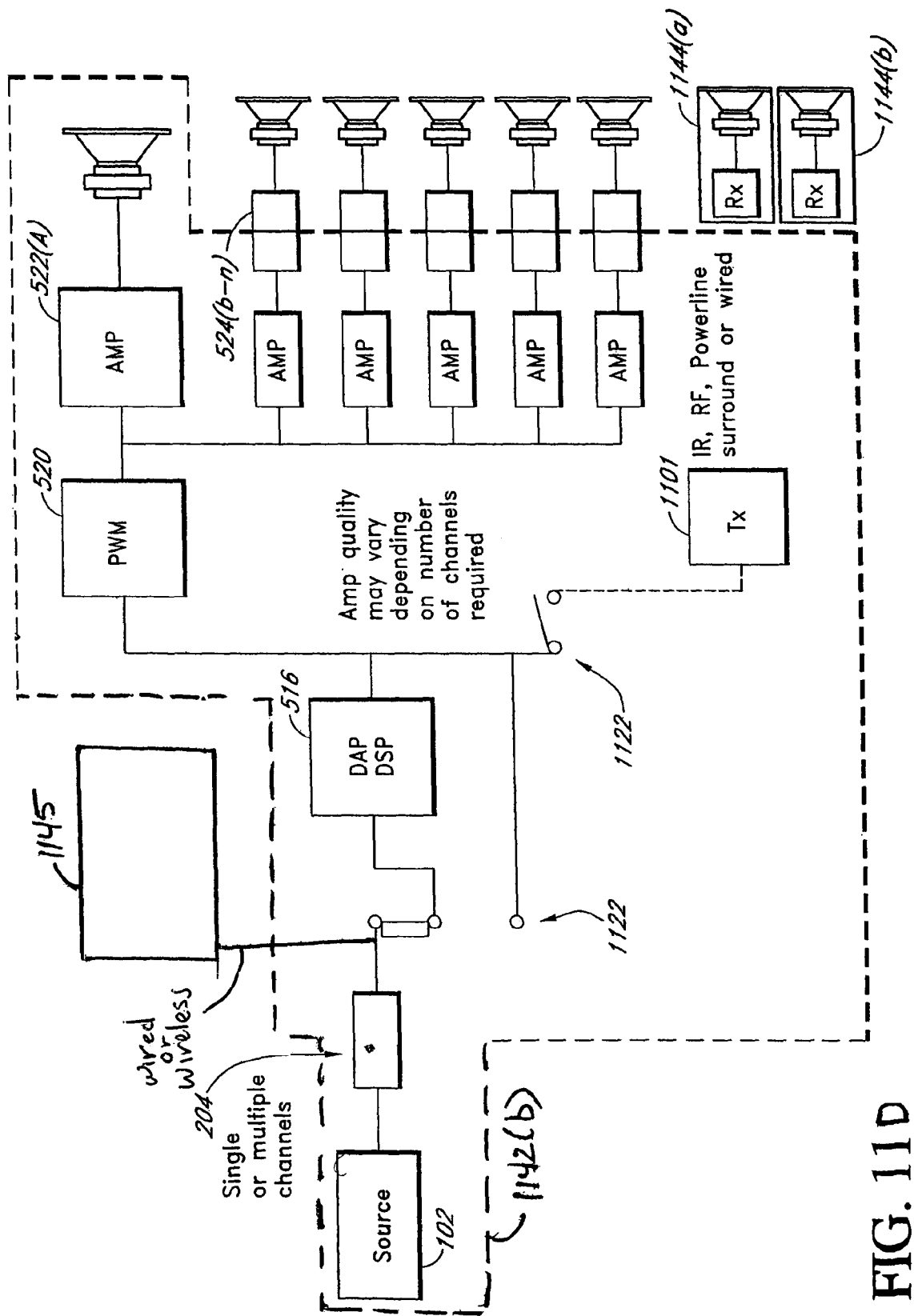
FIG. 11D is a block diagram of signal paths through components of another embodiment of a home entertainment system.

FIGS. 11C and 11D are block diagrams of audio, control, and video signal paths through components of home entertainment systems. The home entertainment systems receive one or more input signals from an input device 102. Types of input signals can include, for example, audio, video, textual, and control signals. These signals can originate from one or more input devices 102 depending on the type of input signal. For example, a digital video disk (DVD) provides an audio signal and a video signal to the home entertainment system. For ease of explanation, the following description uses an audio signal and a video signal as exemplary input signals to the home entertainment systems. However, the communication system 100 is not so limited and can be used with textual and any other information signal. Examples of input devices 102 that generate an audio signal include a personal computer, DVD player, a stereo receiver, MP3 player, compact disk (CD) player, digital audio tape (DAT), TV, cable set top, satellite set top, media center, network client, and the like. DVD audio signals can include, for example, dolby digital and/or DTS digital signals.

Examples of input devices 102 that generate a video signal include a DVD player, laserdisc player, camcorders, VHS player, and the like. Examples of control signals include, volume level, fader level, balance level, sub-bass level, destination source, sound processing selection, equalizer levels, power on, power off, or any other manipulation of the audio signal.

Each of the home entertainment systems illustrated in FIGS. 11C and 11D comprises a housing for a center channel loudspeaker 1142(*a*), 1142(*b*). The embodiments of the center channel loudspeaker 1142(*a*), 1142(*b*) illustrated in FIGS. 11C and 11D comprise different components which are arranged within the housing for each respective center channel loudspeaker 1142(*a*), 1142(*b*). The embodiment of the center channel loudspeaker 1142(*a*) illustrated in FIG. 11C receives one or more input signals from an input device 102 that is external to the center channel loudspeaker 1142(*a*) housing. The connection between the input device 102 and the center channel loudspeaker 1142 can utilized digital or analog specialty cable. The specialty cable combines the signals from the input device 102 into a single cable. The single cable can connect to the rear panel of the input device 102. In contrast, the embodiment of the center channel loudspeaker 1142(*b*) illustrated in FIG. 11D receives one or more input signals from an input source that is internal to the center channel loudspeaker 1142(*b*) housing. Therefore, the center channel loudspeaker 1142(*b*) can include loudspeakers, transmitters, a personal computer, a DVD player, a stereo receiver, a MP3 player, a compact disk (CD) player, a digital audio tape (DAT), a TV, a cable set top, a satellite set top, a media center, a network client, and the like.

Each home entertainment system can further comprise a TV, video monitor, or other display device 1145 for displaying one or more of the input signals. For example, the display device 1145 can display a video signal from the input device 102 when the input device is a DVD player. Continuing with this example, the audio signal associated with the video signal is processed by the center channel loudspeaker 1142(*a*), 1142(*b*) and transmitted to a remote loudspeaker. Textual information can also be displayed on the display device 1145. For example, information related to an audio signal (song title, artist, track order, elapsed time and other information) can be displayed on the display device 1145.

The display device 1145 can be connected directly to the input device 102 or, as illustrated in FIGS. 11C and 11D, indirectly to the input device 102 via the center channel loudspeaker 1142(*a*), 1142(*b*). The connection between the display device 1145 and the center channel loudspeaker 1142(*a*), 1142(*b*) or input device 102 can be wired or wireless. Since the center channel loudspeaker 1142(*a*), 1142(*b*) is advantageously located near the display device 1145, ease of installation is enhanced by routing the video signal together with one or more other signals to the center channel loudspeaker 1142(*a*), 1142(*b*). However, as explained above, the invention is not limited to the video signal routing illustrated in FIGS. 11C and 11D.

The components of the center channel loudspeaker 1142(*a*)/1142(*b*) may comprise a DSP module 516 for multiple channels, a PWM converter/amplifier module 520, a power stage module 522 for the center channel, and an IR transmitter 1101. Depending on the channel format available from the source 102, the DSP processes the audio signal into the selected channel configuration, such as Dolby Digital, DTS, SRS or alike. These channel formats include, for example, stereo, 2.1, 3.1, 5.1, 6.1 and 7.1 and the like. The DSP may further process control information such as equalizer information, volume or other signal processing information.

The input device 102 may select from one or more surround sound formats for the audio signal associated with a selected DVD. The one or more surround sound formats may each have a different number of channels or the same number of channels.

Each of the multiple channels or audio tracks can be a discrete audio channel or a virtual audio channel. Discrete audio channels are unique channels with respect to the other channels received from the same input source 102 and are not derived from the other channels. Virtual or derived audio channels are created from the other channels. An exemplary virtual surround sound format is Sound Retrieval System (SRS). SRS make use of only a left channel and a right channel to create an acoustic effect which emulates a surround sound format. A DVD encoded with a 5.1 channel configuration may employ, for example, a dolby digital format or a DTS format. As explained below, dolby digital as well as DTS each may include discrete channels or a combination of discrete and virtual channels.

Dolby digital 5.1 is a surround sound format which provides up to five discrete (independent) channels (center channel, left front, right front, surround left, surround right; giving it the "5" designation) of full frequency effects (for example, from 20 Hz to 20,000 Hz). The center loudspeaker is placed at the front center of the audio listening area. The center channel is often aligned with a vertical axis that passes through the center of the display device 1145. In this way, the center channel is preferably located above or below the display device 1145. The left and right front loudspeakers are placed on both sides of the center channel loudspeaker. The surround left and surround right loudspeakers are placed on respective sides of the audio listening area. Thus, five discrete loudspeakers are located around the audio listening area for reproducing five discrete channels.

A dolby digital 5.1 signal further includes an optional sixth channel dedicated for low frequency effects (LFE). A subwoofer loudspeaker is often included in the audio listening area and is specifically designed to reproduce LFE. The LFE channel gives dolby digital the "0.1" designation. The "0.1" signifies that the sixth channel is not full frequency, as it contains only deep bass frequencies (for example, 20 Hz to 120 Hz). Many DVD titles come with a dolby digital 5.1 audio signal. Other variants of dolby digital include mono (dolby digital 1.0), two channel dolby digital (stereo or dolby digital 2.0), and five channels of audio (dolby digital). DTS Digital Surround (a.k.a. DTS) is another 5.1 channel configuration format.

Depending on the audio signal, the DSP module 516 may decode a hybrid 5.1 channel configuration format. Hybrid 5.1 channel configurations include, for example, THX Surround EX (a.k.a. dolby digital EX) and DTS Extended Surround (DTS-ES). THX Surround EX is the extended surround version of dolby digital 5.1, while DTS-ES is the extended surround version of DTS 5.1. These hybrid 5.1 channel configurations differ from their true 5.1 counterparts in that the hybrids derive or create a sixth full frequency channel or surround back channel from the existing channels. THX Surround EX and DTS-ES create the surround back channel from the surround left and surround right channels. Thus, the surround back channel is not a true discrete channel. This surround back channel is properly located behind the audio listening area.

Unlike the format described above, DTS-ES discrete 6.1 is a true 6.1 channel format. DTS-ES 6.1 supports a discrete surround back channel. Thus, the DSP module 516 decodes a surround back channel from a discrete data stream that is independent from those of the surround left and surround right channels. This surround back channel may be utilized with two surround back channel loudspeakers. Each back channel loudspeaker can be spaced symmetrically behind the audio listening area. Since DTS-ES 6.1 only provides six discrete full frequency channels and one LFE channel, an audio listening area employing two surround back channels loudspeakers has a hybrid 6.1 channel configuration.

In the embodiment illustrated in FIGS. 11C and 11D, the receiver components 1142 further comprise power stage modules 524(*b*)-(*n*) for other audio channels in addition to the amplifier for the center channel. In some embodiments, for example, the receiver components 1142 comprise power stage modules for the subwoofer loudspeaker, left loudspeaker, right loudspeaker, effects loudspeaker, surround/satellite loudspeaker and the like.

For example, depending on the channel format desired, a corresponding number of distinct loudspeakers and channels of amplification may be employed. Amplification for each discrete channel may be performed in separate amplifiers. Amplification may be employed in a different loudspeaker than the designated loudspeaker, for example, the center channel loudspeaker 1142(*a*) can amplify the left front channel. Alternatively, the amplification may be performed in the designated loudspeaker. Due to the high power requirements to reproduce low frequency effects, amplification of the LFE (0.1 designation) subwoofer channel can be performed separately from amplification of the other full frequency channels. However, such an arrangement is not required to practice the invention.

In operation, the receiver components 1142 receive an input signal from the input device 102. The input signal can be in the form of a digital or analog signal. The input signal(s) is provided to the receiver components 1142 via connector interface 204. When the input signal comprises a video signal, the video signal is routed through the center channel loudspeaker 1142 and to the display device 1145. The audio signal is routed to the DSP module 516. The DSP module 516 processes the input signal for one or more of the channels. As shown in the embodiments of FIGS. 11C and 11D, the DSP module 516 may process the input signals for all the channels, some of the channels or none of the channels.

A series of jumpers or switches 1122 allows the input signals for the loudspeakers to be either processed by the DSP module 516, sent directly to PWM or transmitted to the loudspeakers. The center channel loudspeaker 1142 illustrated in FIGS. 11C and 11D provides audio channel signals to the power stage modules 524(*b*)-(*n*). FIGS. 11C and 11D illustrate five power stage modules 524(*b*)-(*n*). In other embodiments, more or less power stage modules 524(*b*)-(*n*) may be used depending on the number of channels that are amplified by the center channel loudspeaker 1142. The center channel loudspeaker 1142 illustrated in FIGS. 11C and 11D further provides two audio channels to the IR transmitter 1101. The two channels provided to the IR transmitter 1101 are wireless transmitted to the loudspeakers 1144(*a*), 1144(*b*). The wireless transmission technique may utilize, for example, RF or an IR transmitter 1101. The IR transmitter 1101 is configured to transmit the combined signal to one or more loudspeakers 1144(*a*)-(*b*). Each IR transmitter 101 can transmit one channel or multiple channels. Alternatively, multiple IR transmitters 1101 are utilized to transmit the audio channels.

In other embodiments, the center channel loudspeaker 1142 amplifies fewer audio channels and thus may require fewer power stage modules 524(*b*)-(*n*). In such embodiments, the non-amplified audio channels are wirelessly transmitted to loudspeakers in addition to the loudspeakers 1144(*a*), 1144(*b*) that are illustrated in FIGS. 11C and 11D as receiving a wireless audio signal.

This other loudspeaker can be a surround loudspeaker, multiple surround loudspeakers, or other speaker. Typically, it is advantageous to transmit to loudspeakers other than left, right, or center in a surround sound system described above. In the embodiment illustrated in FIG. 11C, the IR transmitter 1101 in the center channel loudspeaker encodes and transmits a signal to the surround or satellite loudspeakers via an infrared network. Alternatively, the IR transmitter 1101 in the center channel loudspeaker transmits the combined signal via powerline, RF, wireless, or a wired network to the surround or satellite loudspeakers.

The amplifier module 520 is coupled to the DSP module 516 and receives the audio signal. The amplifier module 520 converts the audio signal to a pulse width modulation (PWM) signal. The PWM signal is amplified by the power stage 522. The amplified signal is broadcast via outputs 524(*a*)-(*n*).

Figure 11E:
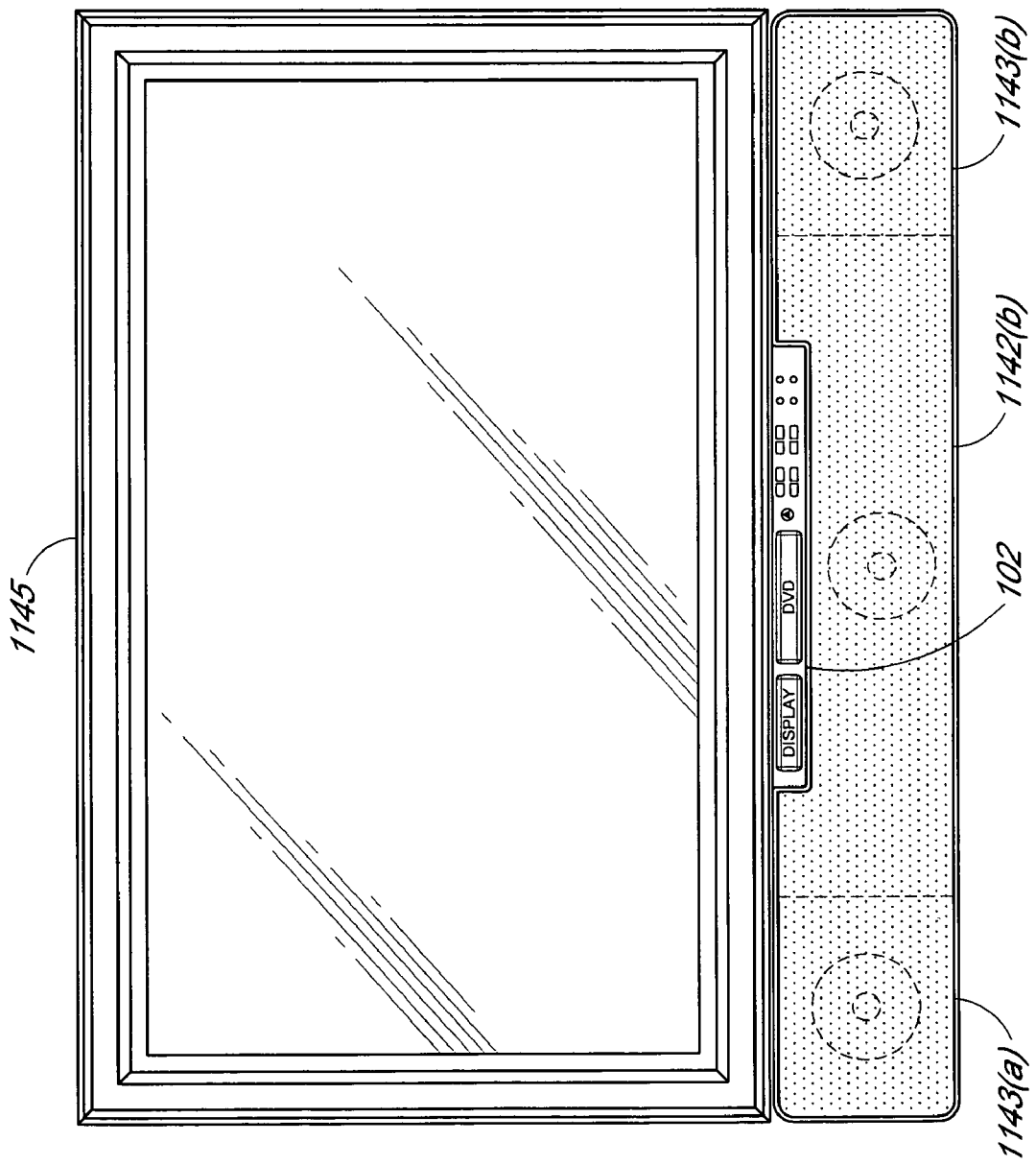
FIG. 11E is a front view of the display device from FIG. 11D arranged adjacent to the center channel loudspeaker from FIG. 11D.

FIG. 11E is a front view of the display device 1145 from FIG. 11D arranged adjacent to the center channel loudspeaker 1142(*b*) from FIG. 11D. A left front loudspeaker 1143(*a*) and a right front loudspeaker 1143(*b*) are further illustrated in FIG. 11E. The left front loudspeaker 1143(*a*) is located below the display device 1145 and to the left side of the center channel loudspeaker 1142(*b*). The right front loudspeaker 1143(*b*) is located below the display device 1145 and to the right side of the center channel loudspeaker 1142(*b*). As described above with reference to FIG. 11D, the center channel loudspeaker 1142(*b*) comprises an input device 102 which is internal to the housing for the center channel loudspeaker 1142(*b*). In the embodiment, illustrated in FIG. 11E, the input device 102 is a DVD player. Examples of other input devices 102 include a personal computer, a stereo receiver, MP3 player, compact disk (CD) player, digital audio tape (DAT), and the like.

Figure 12:
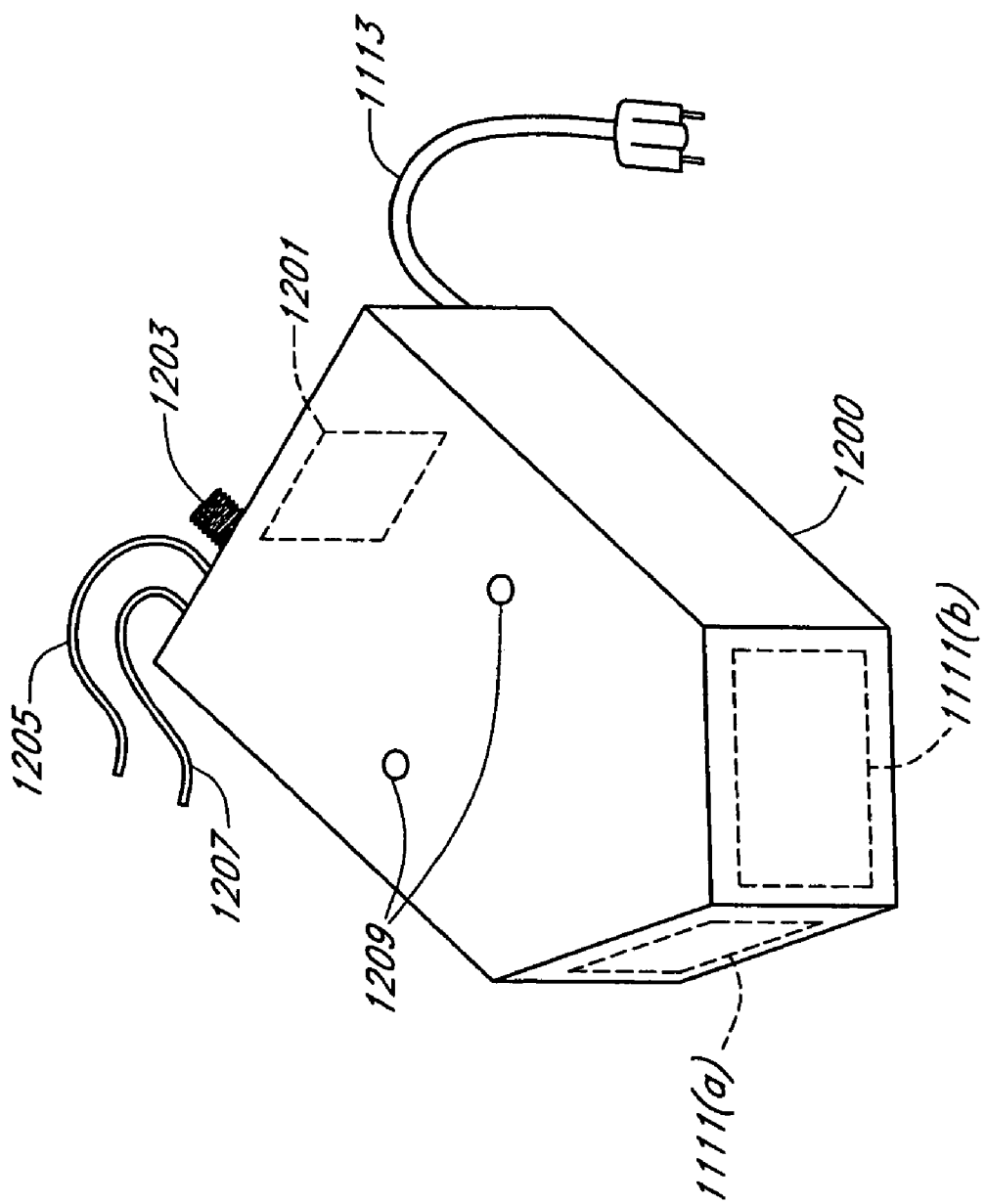
FIG. 12 is a perspective view of a housing for the receiver components from FIG. 11A.

FIG. 12 is a perspective view of a housing 1200 for the receiver components 1140 described in FIG. 11A. As shown in FIG. 12, the housing 1200 can include two detectors 1111(*a*), (*b*) and a power supply 1113 as described with reference to FIG. 11. Detectors can be located on the same or different surfaces of the IR receiver 1109. For example, the embodiment shown in FIG. 12 further includes detector 1201 on a different surface of the housing 1200. By locating one or more detectors 1111, 1201 on different surfaces of the housing 1200, the IR receiver can receive the transmitted combined signal from the IR transmitter 1101 from more than one direction. The housing 1200 can further include audio output lines 1205, 1207. The audio output lines provide the manipulated audio signal to one or more loudspeakers 1115 (see FIG. 11). In one embodiment, the housing 1200 includes a female or male fastener 1203 for mounting the housing 1200 to a speaker bracket. The housing 1200 can further include mounting holes 1209. The mounting holes 1209 allow the housing 1200 to be mounted inside or outside of the loudspeaker 1115.

Figure 13:
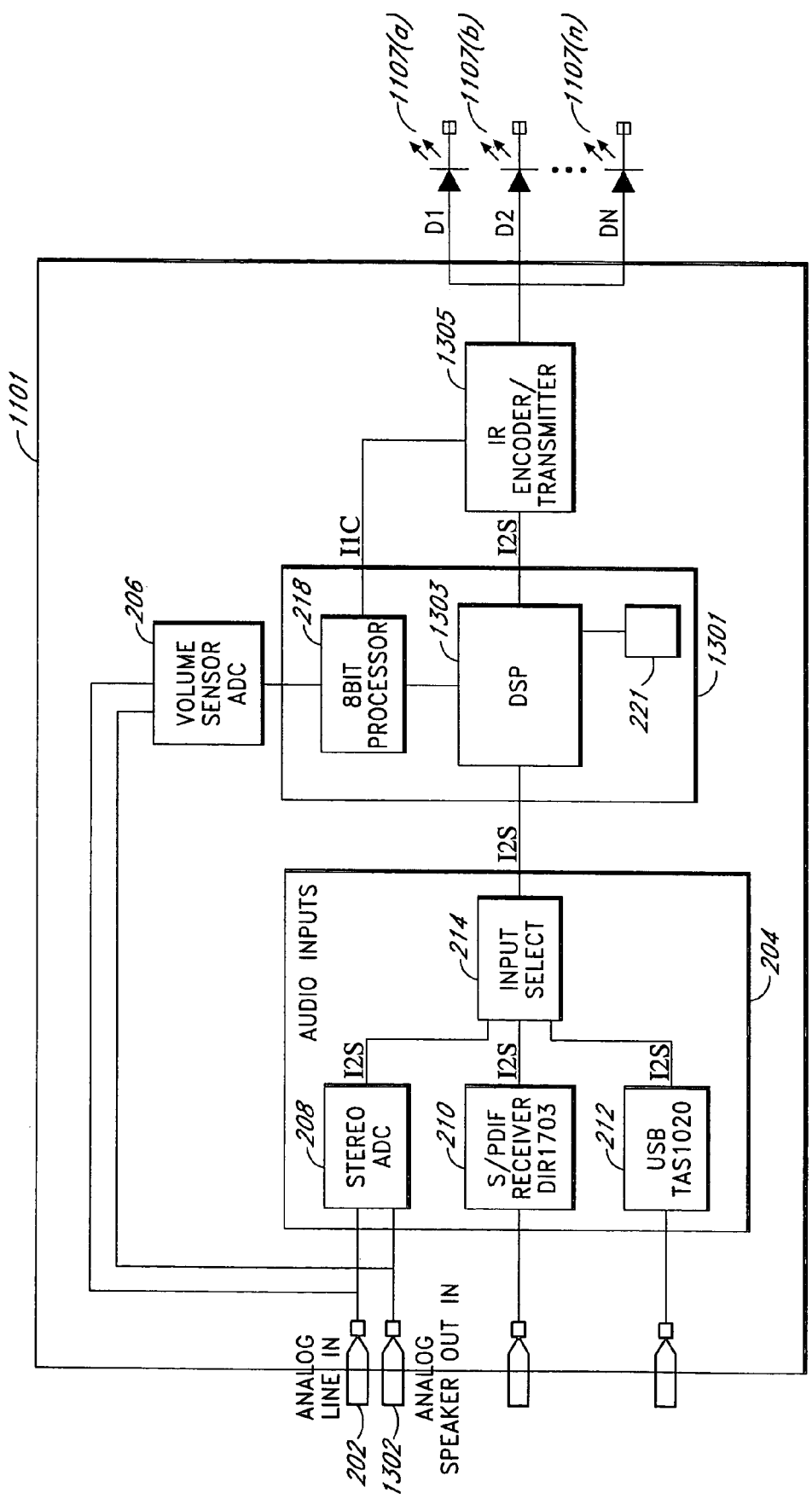
FIG. 13 is a block diagram of one embodiment of the IR transmitter shown in FIG. 11.

FIG. 13 is a block diagram of one embodiment of the IR transmitter 1101 shown in FIG. 11. The IR transmitter 1101 can be configured to receive, format, and transmit a combined signal via the IR network. The IR transmitter 1101 can comprise an audio input connector 204, a signal processing module 1301, a volume sensor analog-to-digital converter (A/D) 206, and an IR encoder/transmitter module 1305. The audio input connector 204 is the same as described with reference to FIG. 2 except that the audio input connector can additionally or alternatively comprise a speaker-level input connector 1302. The speaker-level input connector 1302 allows the IR transmitter 1101 to receive speaker level analog signals and line level analog signals. The volume sensor 206 is the same as described with reference to FIG. 2. The volume sensor analog-to-digital converter (A/D) 206 can be coupled to the signal processing module 1301. The IR encoder 1305 is further connected to transmitting diodes 1107(a)-(n).

The signal processing module 1301 can include an 8-bit processor 218, a digital signal processor 1303, and a destination source switch 221. The 8-bit processor 218 and the destination source switch 221 are the same as described with reference to FIG. 2. The digital signal processor 1303 can be configured to decode algorithms, for example, DTS, Dolby, Dolby Digital, and perform pre-processing before transmission by the IR transmitter 1101. The signal processing module 1301 provides the control signal and the audio signal to the IR encoder 1305. The IR encoder 1305 combines the audio signal and the control signal for its transmission via, for example, the diode 1107. In one embodiment, the DSP is configured to process and encode the control signal and the audio signal. For example, the address of the destination receiver module can be encoded by the DSP. In this embodiment, the destination source switch 221 is not utilized.

Figure 14:
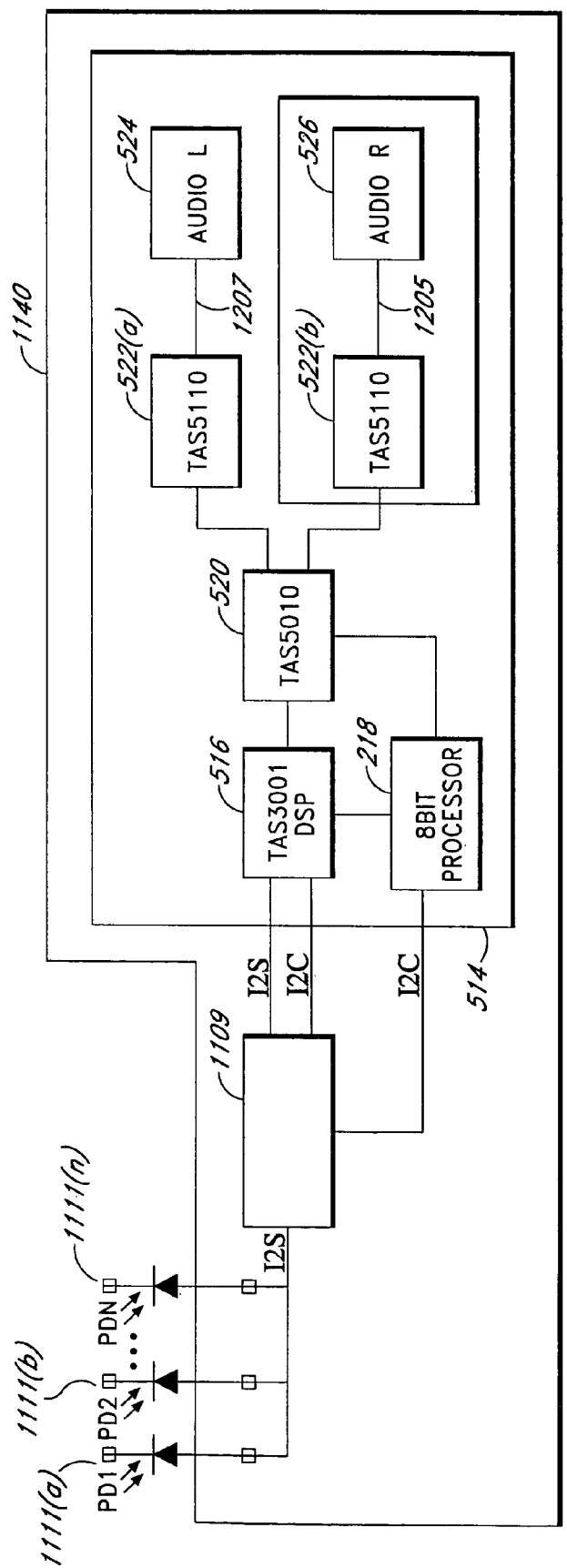
FIG. 14 is a block diagram of audio and control signal paths through an embodiment of the receiver components 1140 from FIG. 11.

FIG. 14 is a block diagram of audio and control signal paths through an embodiment of the receiver components 1140 from FIG. 11. For ease of explanation, the following describes the IR receiver components 1140. However, the following description also applies to the headphone embodiment of the IR receiver 1119. The receiver components 1140 are configured to receive and decode the combined signal received via the IR network. The receiver components 1140 can be further configured to manipulate and amplify the audio signal and then broadcast the amplified signal. One embodiment of the receiver components 1140 includes optical detector 1111(a)-(n), IR receiver 1109, and an amplifier module 514.

The detector 1111 is configured to receive the combined signal transmitted by the IR transmitter 1101 (see FIG. 11). The detector 1111 provides the combined signal to the IR receiver 1109. As shown in FIG. 14, the combined signal can be in an $I^2S$ format. Other formats for transmitting the combined signal are within the scope of the invention. The IR receiver 1109 receives the combined signal via the detector 1111. The decoder/receiver 1109 is configured to decode and extract the audio signal from the control signal. In embodiments where an address corresponding to a destination receiver is transmitted, the extracted signals are only provided to the amplifier module 514 of the destination receiver. In one embodiment, the 8-bit processor 218 is configured to receive the address and determine whether its associated received corresponds to the address. If the address does not correspond, the receiver will enter a standby mode and not amplify the signal. Thus, depending on whether the address corresponds to the receiver receiving the signal, that receiver can be enabled and amplify the signal, or disabled and not amplify the signal. In one embodiment, the receiver components 1140 time out in response to not receiving their address for a period of time and power down to a standby mode. If the transmitted address changes and corresponds to the receiver components 1140 in standby mode, the receiver will be enabled, power up, and play.

The amplifier 514 receives the extracted audio signal and control signal from the IR receiver 1109. The amplifier 514 is configured to manipulate and amplify the audio signal and then broadcast the amplified signal. The amplifier 514 can include, for example, a digital signal processor module 516, an amplifier module 520, a power stage module 522(a)-(b), and outputs 524, 526. The components of the amplifier 514 are the same as described above with reference to FIG. 5.

The foregoing description details certain preferred embodiments of the present invention and describes the best mode contemplated. It will be appreciated, however, that no matter how detailed the foregoing appears in text, the invention can be practiced in many ways. The embodiments of the receivers herein disclosed can be fixed or modular in design. For example, the digital amplifier can be designed for a DSP/DAP to plug into a digital bus. For a modular design, the receiver is configured to connect via Ethernet, wireless, wired, powerline, infrared, and/or RF through a common bus. Examples of common bus designs include $I^2S$, $I^2C$, parallel, and serial.

As is also stated above, it should be noted that the use of particular terminology when describing certain features or aspects of the present invention should not be taken to imply that the terminology is being re-defined herein to be restricted to including any specific characteristics of the features or aspects of the invention with which that terminology is associated. The scope of the present invention should therefore be construed in accordance with the appended claims and any equivalents thereof.

What is claimed is:

1. A device for transmitting signals to speakers, the device comprising: at least one input receiving a multi-channel audio signal from at least one input device, the multi-channel audio signal being encoded in a channel format having multiple channels; a processor converting the received multi-channel audio signal into a plurality of single-channel audio signals, each single-channel audio signal representing one of the multiple channels and being assigned to either a first group or a second group of audio signals, each group comprising at least one of the single-channel audio signals; a power amplifier module configured to amplify only the first group of audio signals; and a transmitter configured to transmit the unamplified second group of audio signals along with at least one destination address to a plurality of speakers via a network, the destination address identifying one of the plurality of speakers for broadcasting at least one of the audio signals in the second group; and a destination address input configured to receive an user input to select one of the speakers for broadcasting the at least one of the audio signals, wherein the destination address is determined based on the user input.

2. The device of claim 1, wherein the transmitter is connected to the plurality of speakers via a powerline network.

3. The device of claim 1, wherein the transmitter is connected to the plurality of speakers via a wireless network.

4. The device of claim 3, wherein the network is RF.

5. The device of claim 3, wherein the network is IR.

6. The device of claim 1, wherein the input is further configured to receive a textual signal and wherein the transmitter is configured to send the textual signal to a display device.

7. The device of claim 1, wherein the processor is further connected to a display device configured to be a user interface for the processor.

8. The device of claim 1, wherein the input is further configured to receive a video signal and wherein the transmitter is configured to send the video signal to a display device.

9. The device of claim 1, wherein the input is configured to receive an analog signal, wherein the device further comprises a converter configured to convert the analog signal into a digital signal.

10. The device of claim 1, wherein the audio signal is encoded in one of the following channel format: DTS, Dolby Digital, and SRS.

11. The device of claim 1, wherein the processor is configured to decode the audio signal and select the one speaker for broadcasting the at least one of the audio signals in the second group based on a channel format of the audio signal.

12. The device of claim 1, wherein the destination address is determined based on user input.

13. The device of claim 1, further comprising a plurality of connectors and an input selector, wherein at least two of the connectors are configured to connect to different devices, and wherein the input selector is reconfigurable by a user to select one of the connectors and receive an audio signal from the selected connector.

14. The device of claim 13, wherein the connectors are configured to connect to at least one of the following inputs: analog, digital, SPDIF, and an inter IC sound ($I^2S$) format.

15. The device of claim 14, wherein the device is located inside or proximate to at least one of the following input devices: a television, a compact disc player, a digital video disc player, a MP3 player, a set-top box, a personal computer, and a stereo receiver.

16. The device of claim 1, wherein the processor is configured to (a) extract a characteristic from the audio signal, (b) code the characteristic into a control signal, (c) combine the second group of audio signals with the control signal to form a combined signal, and (d) send the combined signal to the transmitter, and wherein the transmitter sends the combined signal along with the destination address to the speakers.

17. The device of claim 16, wherein the control signal comprises at least one of the following: a volume level, a balance level, a fader level, a sub-bass level.

18. The device of claim 16, wherein the characteristic does not represent an encoding format of the received audio signal.

19. The device of claim 16, wherein the characteristic is extracted and coded into the control signal prior to the second group of audio signals and the control signal being transmitted to the speakers via the network.

20. The device of claim 1, wherein the transmitter is configured to transmit a combined signal comprising a control signal and the second group of audio signals.

21. The device of claim 20, wherein the control signal comprises at least one of the following: a sound processing selection, an equalizer level, a power on, a power off, a time delay, and a phase delay.

22. The device of claim 1, wherein the plurality of speakers comprises a subwoofer.

23. The device of claim 1, wherein the plurality of speakers comprises a surround speaker.

24. The device of claim 1, wherein the transmitter further comprises an encryption module configured to encrypt the output signal prior to transmission.

25. The device of claim 1, wherein the second group of audio signals comprises a first and a second signal different from the first signal, wherein the transmitter transmits the first signal for a first speaker to broadcast and the second signal for a second speaker to broadcast, the first and second speaker being selected from the plurality of speakers.

26. The device of claim 1, further comprising a control input receiving control signal from a user, wherein the processor generates the second group of audio signals based on the control signal from a user.

27. The device of claim 1, wherein the transmitter is connected to a speaker via a receiver within or proximate to the speaker.

28. A device for transmitting signals to speakers, the device comprising: means for receiving a multi-channel audio signal from at least one input device, the multi-channel audio signal being encoded in a channel format having multiple channels; means for converting the received multi-channel audio signal into a plurality of single-channel audio signals, each single-channel signal representing one of the multiple channels and being assigned to either a first group or a second group of audio signals, each group comprising at least one of the single-channel audio signals; means for amplifying only the first group of audio signals; and a transmitter configured to transmit the unamplified second group of audio signals along with at least one destination address to a plurality of speakers, via a network, the destination address identifying one of the plurality of speakers for broadcasting at least one of the audio signals in the second group; and a destination address input configured to receive an user input to select one of the speakers for broadcasting the at least one of the audio signals, wherein the destination address is determined based on the user input.

29. A device comprising: at least one input receiving a multi-channel audio signal from at least one input device, the multi-channel audio signal being encoded in a channel format having multiple channels; a processor configured to decode the received multi-channel audio signal into a plurality of single-channel audio signals, each single-channel audio signal representing one of the multiple channels and being assigned to either a first group or a second group of audio signals, each group comprising at least one of the single-channel audio signals; a power amplifier module configured to amplify only the first group of audio signals received from the processor; and a transmitter configured to transmit the unamplified second group of audio signals along with at least one control signal and one destination address to a plurality of speakers via a network, the destination address identifying one of the plurality of speakers for broadcasting at least one of the audio signals in the second group, wherein the control signal is to be used by the speaker to manipulate at least one of the audio signals in the unamplified second group; and a destination address input configured to receive an user input to select one of the speakers for broadcasting the at least one of the audio signals, wherein the destination address is determined based on the user input.

30. The device of claim 29, wherein the processor is capable of converting an audio signal from any of the following group: a television, a compact disc player, a digital video disc player, a MP3 player, a digital audio tape player, a set-top box, a personal computer, a stereo player, and a media center.

31. The device of claim 29, wherein the processor is capable of converting an audio signal from at least one of the following group: a television, a compact disc player, a digital video disc player, a MP3 player, a digital audio tape player, a set-top box, a personal computer, a stereo player, and a media center.

32. The device of claim 29, wherein the transmitter is connected to a plurality of speakers via a network, the device further comprising a destination selection unit configured to select at least one speaker from the plurality of speakers to receive the output signal.

33. The device of claim 29, wherein the amplifier module is located in proximity to the transmitter.

34. The device of claim 29, wherein the control signal comprises an amplitude level indicating at which amplitude at least one of the audio signals in the second group is to be broadcasted.

35. The device of claim 29, wherein the control signal is received from a user at the device.

36. The device of claim 29, wherein the processor is configured to (a) extract a characteristic from the audio signal, (b) code the characteristic into a control signal, (c) combine at least one of the audio signals in the second group of audio signals with the control signal to form a combined signal, and (d) send the combined signal to the transmitter, and wherein the transmitter sends the combined signal to the speaker.

* * * * *